US012748916B2

(12) United States Patent
Hariri et al.

(10) Patent No.: US 12,748,916 B2
(45) Date of Patent: Sep. 29, 2026

(54) GENERATION OF PERSONALIZED AND STRUCTURED CONTENT USING A COLLABORATIVE ONLINE GENERATOR

(71) Applicant: Google LLC, Mountain View, CA (US)

(72) Inventors: Behnoosh Hariri, New York, NY (US); Gregory George Galante, Little Silver, NJ (US); Rebecca Wenshu Hsieh, Sunnyvale, CA (US); Princeton Tirin Poe, New York, NY (US); Gonzalo Fiorina, Brooklyn, NY (US); Barak Ben Noon, Brooklyn, NY (US); Miles Henrichs, New York, NY (US); Ahsan Wahab, Tampa, FL (US); Amer Mograbi, New York, NY (US); Christopher Gregory Tong, Long Island, NY (US); Nicholas Joseph Pesce, New York, NY (US); Andrew James Motika, Birmingham, MI (US); John Gabriel D'Angelo, New York, NY (US); Tomer Aberbach, Hoboken, NJ (US); Grace Sytin Shih, Cupertino, CA (US); Albert Orriols Puig, Los Altos, CA (US); Jayakumar Hoskere, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 230 days.

(21) Appl. No.: 18/621,892

(22) Filed: Mar. 29, 2024

(65) Prior Publication Data

US 2024/0330580 A1 Oct. 3, 2024

Related U.S. Application Data

(60) Provisional application No. 63/492,926, filed on Mar. 29, 2023.

(51) Int. Cl.
*G06F 40/186* (2020.01)
*G06F 40/103* (2020.01)
*G06F 40/20* (2020.01)

(52) U.S. Cl.
CPC .......... *G06F 40/186* (2020.01); *G06F 40/103* (2020.01); *G06F 40/20* (2020.01)

(58) Field of Classification Search
CPC ....... G06F 40/186; G06F 40/20; G06F 40/103
See application file for complete search history.

(56) References Cited

U.S. PATENT DOCUMENTS 10,943,672 B2 * 3/2021 Pratsevall Garcia ... H04L 67/02
2017/0132198 A1 * 5/2017 Desai ........................ G06F 3/16

(Continued)

OTHER PUBLICATIONS

Canva, "Magic Write: Online AI Text Generator", retrieved on Mar. 29, 2024, https://www.canva.com/magic-write/, 8 pages.

(Continued)

*Primary Examiner* — Tadesse Hailu
(74) *Attorney, Agent, or Firm* — DORITY & MANNING P.A.

(57) ABSTRACT

Systems and methods for generating personalized and structured content using a collaborative generator provide a user interface to a user computing system and receive a prompt from the user computing system via the user interface. The systems and methods provide the prompt to a generative model, with the generative model being a machine-learned model trained to process language input prompts to generate a language output. The systems and methods receive a generative output generated by the generative model in response to the prompt. Additionally, the systems and methods generate a modified output by modifying the generative output based at least in part on historical user data for a user associated with the prompt, and then provide the modified output via the user interface.

16 Claims, 13 Drawing Sheets

(56) References Cited

U.S. PATENT DOCUMENTS

| | | | | |
|---|---|---|---|---|
| 2018/0343482 | A1* | 11/2018 | Loheide | H04N 21/2387 |
| 2019/0163691 | A1* | 5/2019 | Brunet | G06F 40/35 |
| 2020/0028885 | A1 | 1/2020 | Gordon et al. | |
| 2022/0076668 | A1* | 3/2022 | Carbune | G10L 13/02 |
| 2022/0138245 | A1* | 5/2022 | Guimaraes | G06N 7/01 707/739 |
| 2022/0164520 | A1* | 5/2022 | Dolan | G06F 3/04842 |
| 2022/0222703 | A1 | 7/2022 | Lagi et al. | |
| 2022/0229832 | A1* | 7/2022 | Li | G06F 16/24578 |
| 2022/0261817 | A1 | 8/2022 | Ferrucci et al. | |
| 2022/0309348 | A1* | 9/2022 | Guo | G06N 3/0455 |
| 2022/0414320 | A1* | 12/2022 | Dolan | G06F 40/30 |
| 2024/0129601 | A1* | 4/2024 | Brdiczka | H04N 21/854 |
| 2024/0249318 | A1* | 7/2024 | Spiegel | G06Q 30/0269 |
| 2024/0256841 | A1* | 8/2024 | Abrams | G06F 16/9538 |
| 2024/0267344 | A1* | 8/2024 | Mulligan | H04L 51/04 |
| 2024/0273282 | A1* | 8/2024 | Muralidharan | G06F 40/30 |
| 2024/0273286 | A1* | 8/2024 | Iu | G06Q 10/101 |
| 2024/0273291 | A1* | 8/2024 | Smith | G06F 40/56 |
| 2024/0273306 | A1* | 8/2024 | Somaiya | G06F 40/186 |
| 2024/0303415 | A1* | 9/2024 | Wilde | G06F 40/56 |
| 2024/0305589 | A1* | 9/2024 | Dan | H04L 51/02 |
| 2024/0320444 | A1* | 9/2024 | Maschmeyer | G06F 3/04845 |
| 2024/0338554 | A1* | 10/2024 | Schmidt | G06N 3/045 |

OTHER PUBLICATIONS

Writesonic, Inc., "80+ Powerful AI Writing Tools at your Fingertips", retrieved on Mar. 29, 2024, https://writesonic.com/features?via-chatsonicapi&gclid=Cj0KCQiAgaGgBhC8ARIsAAAyLfHxjm36J7msuv77grdJ-va9Q49LowcSnmpgdRIKKbUSCnqFj8XEDIQaAi0SEALw_wcB https://writesonic.com, 9 pages.

International Search Report and Written Opinion for Application No. PCT/US2024/022183, mailed Jul. 23, 2024, 10 pages.

International Preliminary Report on Patentability for Application No. PCT/US2024/022183, mailed Oct. 9, 2025, 6 pages.

* cited by examiner

GENERATION OF PERSONALIZED AND STRUCTURED CONTENT USING A COLLABORATIVE ONLINE GENERATOR

PRIORITY CLAIM

The present application is based on, and claims benefit of priority to, U.S. Provisional Application 63/492,926 having a filing date of Mar. 29, 2023, which is incorporated by reference herein in its entirety.

FIELD

The present disclosure relates generally to online generators, such as online artificial intelligence programs used to generate document content using generative models. More particularly, the present disclosure relates to generating personalized and structured content collaboratively using such online generators.

BACKGROUND

Online generators are often used to create document content, such as for articles, letters, essays, and/or the like, using large language models. However, such generators are outside of documents or environments intended to be filled with the generated content. As such, a user must copy the generated content from the generator over to the intended environment and format the generated content within the intended environment to match existing or desired formatting within the environment. Further, such generators only allow for set or pre-defined actions regarding editing the content generated. As such, a user has limited options for requesting edits from such generators, which often leads to a user needing to perform significant editing after generation, for example, to match a desired voice or tone. Additionally, existing generators lack the ability to personalize the generated content to a particular user. Thus, a user must manually input their information (e.g., name, contact information, contacts, calendar events, or locations) after the generated content is inserted into the development environment.

Accordingly, systems and methods for generating personalized and structured content using a collaborative online generator would be beneficial in the technology.

SUMMARY

Aspects and advantages of embodiments of the present disclosure will be set forth in part in the following description, or can be learned from the description, or can be learned through practice of the embodiments.

One example aspect of the present subject matter is directed to a computing system for automatically generating personalized and structured content. The computing system may include one or more processors, and one or more non-transitory computer-readable media that collectively store instructions that, when executed by the one or more processors, cause the computing system to perform operations. The operations performed may include providing a user interface to a user computing system, receiving a prompt from the user computing system via the user interface, and providing the prompt to a generative model, where the generative model may be a machine-learned model trained to process language input prompts to generate a language output. The operations may further include receiving a generative output generated by the generative model in response to the prompt, and generating a modified output by modifying the generative output based at least in part on historical user data for a user associated with the prompt. Additionally, the operations may include providing the modified output via the user interface.

In some implementations, the operations include providing the generative output generated by the generative model via the user interface. The operations can, in some instances, further include receiving an insertion request from the user computing system via the user interface subsequent to providing the generative output, where the modified output is generated in response to (i.e., after) receiving the insertion request. In one instance, providing the user interface includes providing an integrated development environment in which content is insertable in-line, where the generative output is provided in a generative area of the integrated development environment, with the generative area separating the generative output from being in-line within the integrated development environment, and where the modified output is provided via the user interface by inserting the modified output in-line within the integrated development environment. In one or more instances, the prompt is received within the generative area of the user interface. In some instances, the integrated development environment includes at least one formatting selection interface for selecting formatting rules for text in-line within the integrated development environment, where the modified output is provided in-line within the integrated development environment and formatted according to the formatting rules. In one instance, the prompt is received from the user computing system via selection of text within the user interface, where the text was formatted according to embedded formatting rules, and where the modified output is generated by modifying the generative output based at least in part on the historical user data and the embedded formatting rules received with the selection of text.

In certain example aspects, the generative output includes a block template generated by the generative model, the block template defining one or more fields associated with the prompt, where the modified output may be generated by populating eligible fields of the one or more fields within the block template based on the historical user data, the eligible fields being associated with the historical user data. In some instances, the historical user data is not provided to the generative model. In one instance, the historical user data includes one or more of a name, contact information, contacts, calendar events, or location history associated with the user.

Another example aspect of the present subject matter is directed to a computer-implemented method for automatically generating personalized and structured content. The method may include providing, by a computing system including one or more processors, a user interface to a user computing system. The method may further include receiving, by the computing system, a prompt from the user computing system via the user interface. Further, the method may include providing, by the computing system, the prompt to a generative model, the generative model being a machine-learned model trained to process language input prompts to generate a language output. Furthermore, the method may include receiving, by the computing system, a generative output generated by the generative model in response to the prompt. Moreover, the method may include generating, by the computing system, a modified output by modifying the generative output based at least in part on historical user data for a user associated with the prompt.

Additionally, the method may include providing, by the computing system, the modified output via the user interface.

In some instances, the method further includes providing the generative output via the user interface. In one instance, the method includes receiving, by the computing system, an insertion request from the user computing system via the user interface subsequent to providing the generative output, where the modified output is generated in response to receiving the insertion request. In one or more instances, the generative output includes a block template generated by the generative model, the block template defining one or more fields associated with the prompt, where the modified output is generated by populating, by the computing system, eligible fields of the one or more fields within the block template based on the historical user data, the eligible fields being associated with the historical user data. In some instances, the historical user data is not provided to the generative model. In one instance, the historical user data includes one or more of a name, contact information, contacts, calendar events, or location history associated with the user.

An additional example aspect of the present subject matter is directed to one or more non-transitory computer-readable media that collectively store instructions that, when executed by one or more computing devices, cause the one or more computing devices to perform operations. The operations can include providing a user interface to a user computing system, receiving a prompt from the user computing system via the user interface, and providing the prompt to a generative model, the generative model being a machine-learned model trained to process language input prompts to generate a language output. The operations can further include receiving a generative output generated by the generative model in response to the prompt, and generating a modified output by modifying the generative output based at least in part on historical user data for a user associated with the prompt. Additionally, the operations can include providing the modified output via the user interface.

In some instances, the generative output includes a block template generated by the generative model, the block template defining one or more fields associated with the prompt, where the modified output is generated by populating eligible fields of the one or more fields within the block template based on the historical user data, where the eligible fields are associated with the historical user data. In one instance, the historical user data is not provided to the generative model. In some instances, the historical user data includes one or more of a name, contact information, contacts, calendar events, or location history associated with the user.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
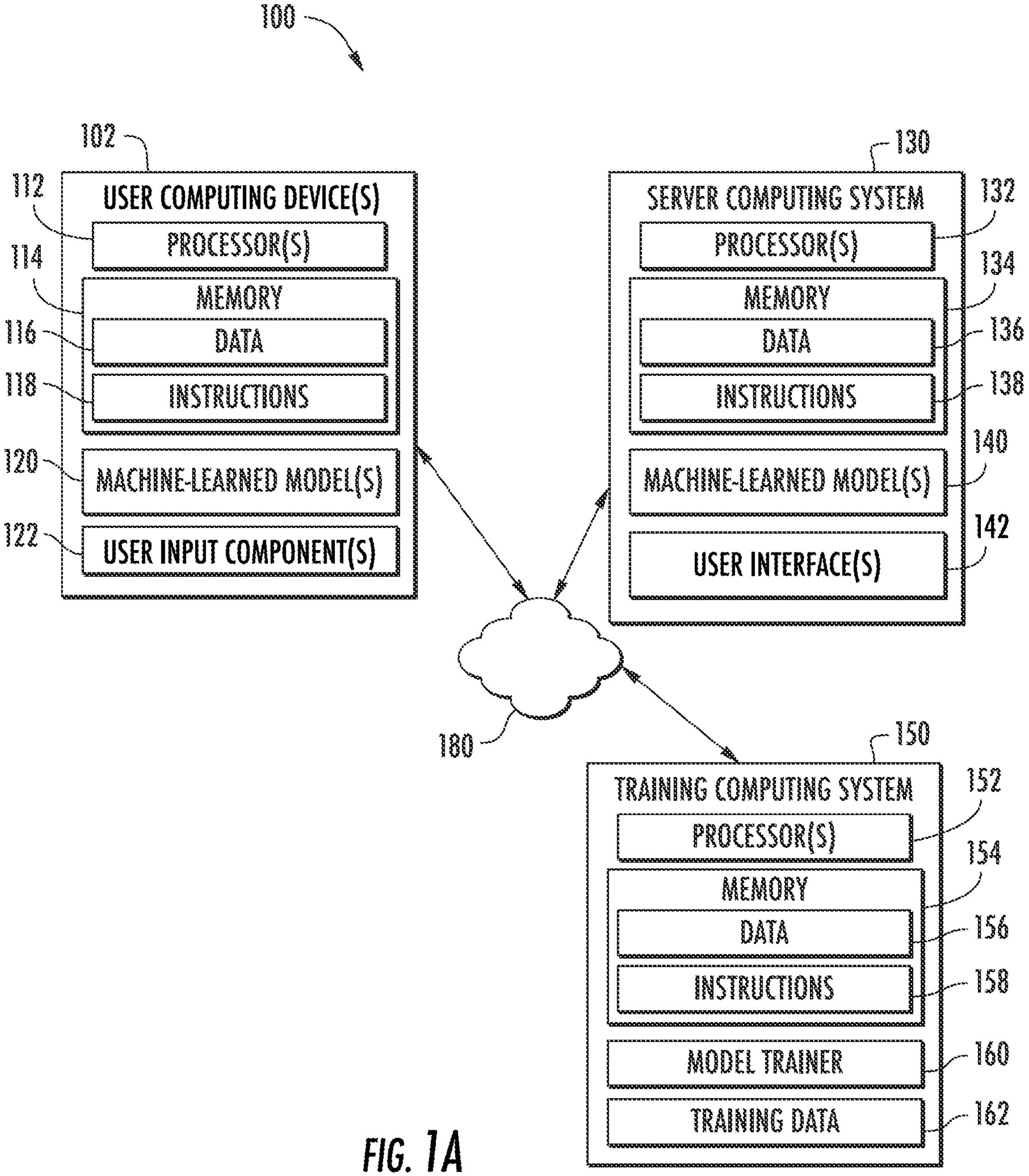
FIG. 1A depicts a block diagram of an example computing system that generates personalized and structured content using generative models according to example embodiments of the present disclosure.

Reference numerals that are repeated across plural figures are intended to identify the same features in various implementations.

DETAILED DESCRIPTION

Overview

Generally, the present disclosure is directed to systems and methods for generating personalized and structured content using generative models (e.g., large language models) in response to prompts. More particularly, the systems and methods disclosed herein optimize and automate aspects of insertion of generative content generated by generative models into integrated development environments. As an example, a computing system can obtain a prompt from a user. The prompt can be processed with a machine-learned generative model to generate generative content based on the prompt. For instance, the prompt may request a blog post, an article, an email, a meeting, code, a trip plan, tables, and/or the like directed to a specific topic and/or including specific details (e.g., as defined/requested in the prompt). A user may request that the model refine (e.g., rephrase, shorten, lengthen, summarize, change tone of, etc.) the generative output content and/or request regeneration (e.g., resubmit the prompt to the model for new generative output content).

The generative output content generated by the generative model may include language content (e.g., text, code, and/or the like) in addition to defining fields for user-related information unknown to the generative model. For example, in some instances, the generative output may define fields for name(s), contact information, calendar events, locations, and/or the like associated with the user. When the generative output content is approved to be inserted into the development environment, the computing system may modify the generated output content using personal, historical user information stored or otherwise accessible by the system to automatically populate the fields and then insert the modified content into the development environment. In such fashion, the computing system can facilitate interactions between the user and the machine-learned large language model to deliver and personalize generated content to the user within the development environment.

Additionally, in some instances, the generative model may not have proper formatting information to format the generative output content to match the desired end location (e.g., development environment). Thus, in some implementations, the computing system may be configured to automatically modify the generative output content to match the formatting rules of the development environment when the generative output content is approved to be inserted into the development environment. In one implementation, the prompt may include embedded formatting rules, which may be passed along with the generative output content to the computing system for the computing system to modify the generative output content to correspond to the formatting rules upon insertion. In some implementations, the generative model may parse the generative content to identify different content levels (e.g., title, heading, sub-heading, body, etc.) within the generative content such that the computing system may more easily format the generative content according to the formatting rules. However, in other instances, the computing system may parse the generative content to identify the different content levels. In such fashion, the computing system can facilitate interactions between the user and the machine-learned large language model to deliver and format generated content to the user within the development environment.

Aspects of the present disclosure provide a number of technical effects and benefits. As one example technical effect and benefit, users of conventional generative models, separate of development environments (e.g., word processing applications, etc.) often must spend substantial quantities of time and effort navigating between the generative models and the development environment to generate generative content using the generative models, inserting the generative content into the development environment, personalizing the pasted generative content, and formatting the generative content, etc. However, by optimizing interactions between users, machine-learned large language models, and development environments, implementations of the present disclosure can substantially reduce the time required by users. In turn, this eliminates the expenditure of substantial quantities of computer resources that a user would otherwise use (e.g., compute cycles, power, memory, etc.). Further, by reducing the time expense of users, implementations of the present disclosure can increase efficiency across a number of use-cases (e.g., software engineering, medical research, citing documents for research papers, etc.). Moreover, as personal user data is not provided to the generative model, user privacy is protected. Additionally, as the generative model does not need to populate user information-based fields based on personal user data for each refinement/regeneration, and similarly, as the computing system only needs to populate the user information-based fields based on the personal user data after the generative model has been refined/regenerated, substantial quantities of computer resources (e.g., compute cycles, power, memory, etc.), that would otherwise be used by the generative model and/or computing system, are eliminated.

With reference now to the Figures, example embodiments of the present disclosure will be discussed in further detail.

Example Devices and Systems

FIG. 1A depicts a block diagram of an example computing system 100 that generates personalized and structured content using generative models according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example models 120 are discussed with reference to FIGS. 2-12B.

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120 (e.g., to perform parallel generative content generations using such model(s) 120 across multiple instances of content requests).

More particularly, the generative model 120 can be trained to process a prompt and generate content based on the prompt. The content can include text (e.g., a response to a question in the prompt), one or more images, one or more audio files, and/or other content. The generative model 120 can include a large language model, a text-to-image model, and/or the like. In some implementations, the language model can additionally be utilized for tokenization determination, autocompletion, template generation, and/or prompt term suggestions during the prompt crafting process.

Additionally, or alternatively, one or more models 140 can be included in or otherwise stored and implemented by the server computing system 130 that communicates with the user computing device 102 according to a client-server relationship. For example, the models 140 can be implemented by the server computing system 130 as a portion of a web service (e.g., a content generation service). Thus, one or more models 120 can be stored and implemented at the user computing device 102 and/or one or more models 140 can be stored and implemented at the server computing system 130.

The user computing device 102 can also include one or more user interface components 122 that receives user input and/or provides user interfaces to a user. For example, the user interface component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user interface components include a microphone, a traditional keyboard, camera, or other means by which a user can provide user input and/or experience user interfaces.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 2-12B.

The server computing system 130 may include, store, and/or access a user interface 142 that can be utilized to interface with one or more users. The user interface 142 can be utilized to obtain inputs from the user via communication with the user interface component(s) 122 and may be utilized to provide outputs for display. The user interface 142 may include a development environment interface, through which a machine-learned model(s) 120, 140 is accessible.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the models 120 and/or 140 based on a set of training data 162. The training data 162 can include, for example, example prompts, example templates, example language data, example image data, example labels, example tokens, and/or term replacements.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output, image description output (e.g., natural language description of the image), and/or the like. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output. As an additional example, the machine-learned model(s) can process the text or natural language data to generate computer language (e.g., a code block, and/or the like) responsive to the processed text or natural language. For instance, if the text or natural language is "write a program that says 'Hello World'," the machine-learned model(s) may return a code for a program that says "Hello World."

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output. As an additional example, the machine-learned model(s) can process the speech data to generate computer language (e.g., a code block, and/or the like), responsive to the processed speech. For instance, if the speech is "write a program that says 'Hello World'," the machine-learned model(s) may return code for a program that says "Hello World."

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may include compressed audio data. In another example, the input includes visual data (e.g. one or more images or videos), the output includes compressed visual data, and the task is a visual data compression task. In another example, the task may include generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may include a text output which is mapped to the spoken utterance. In some cases, the task includes encrypting or decrypting input data. In some cases, the task includes a microprocessor performance task, such as branch prediction or memory address translation.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
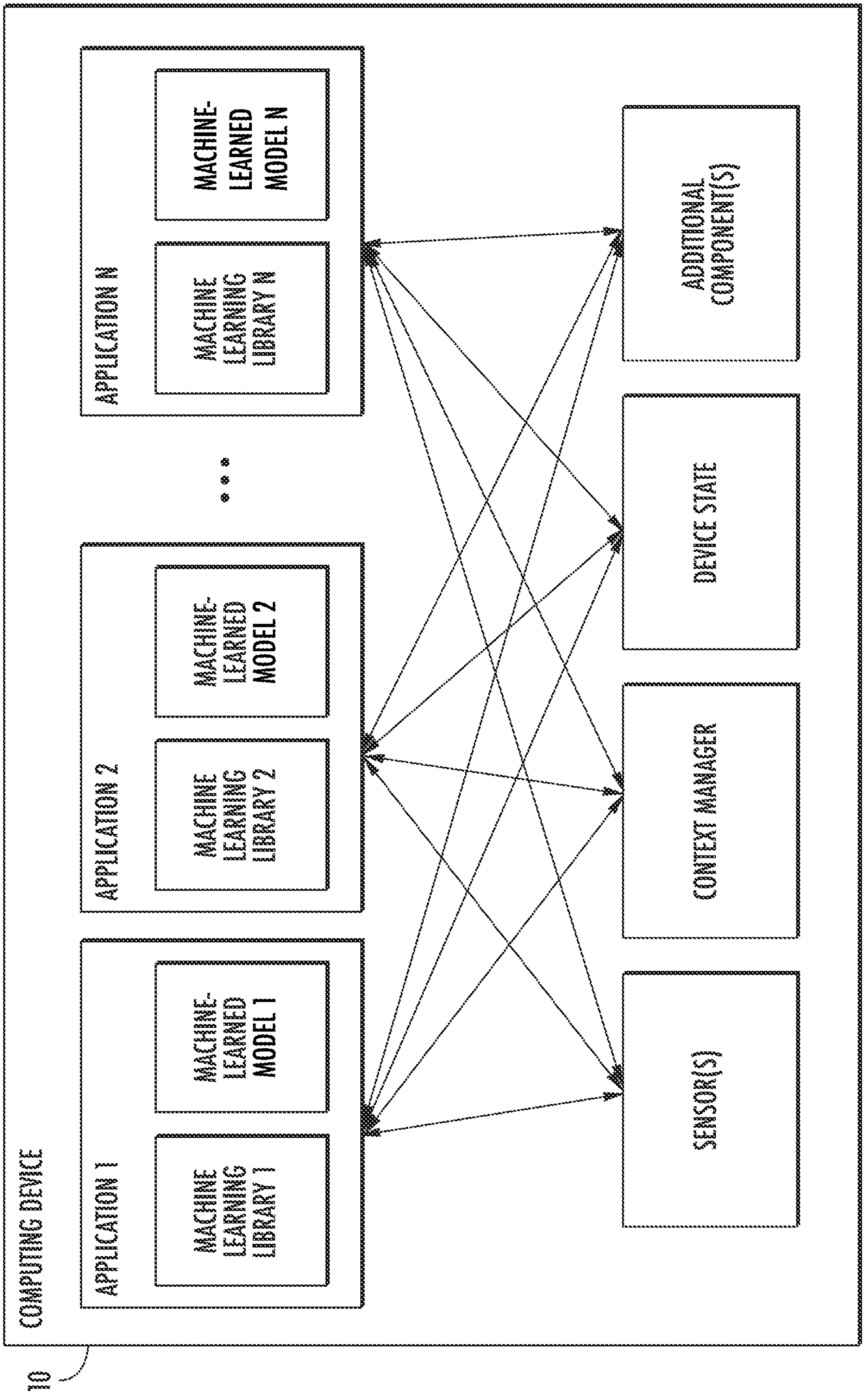
FIG. 1B depicts a block diagram of an example computing device that generates personalized and structured content using generative models according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
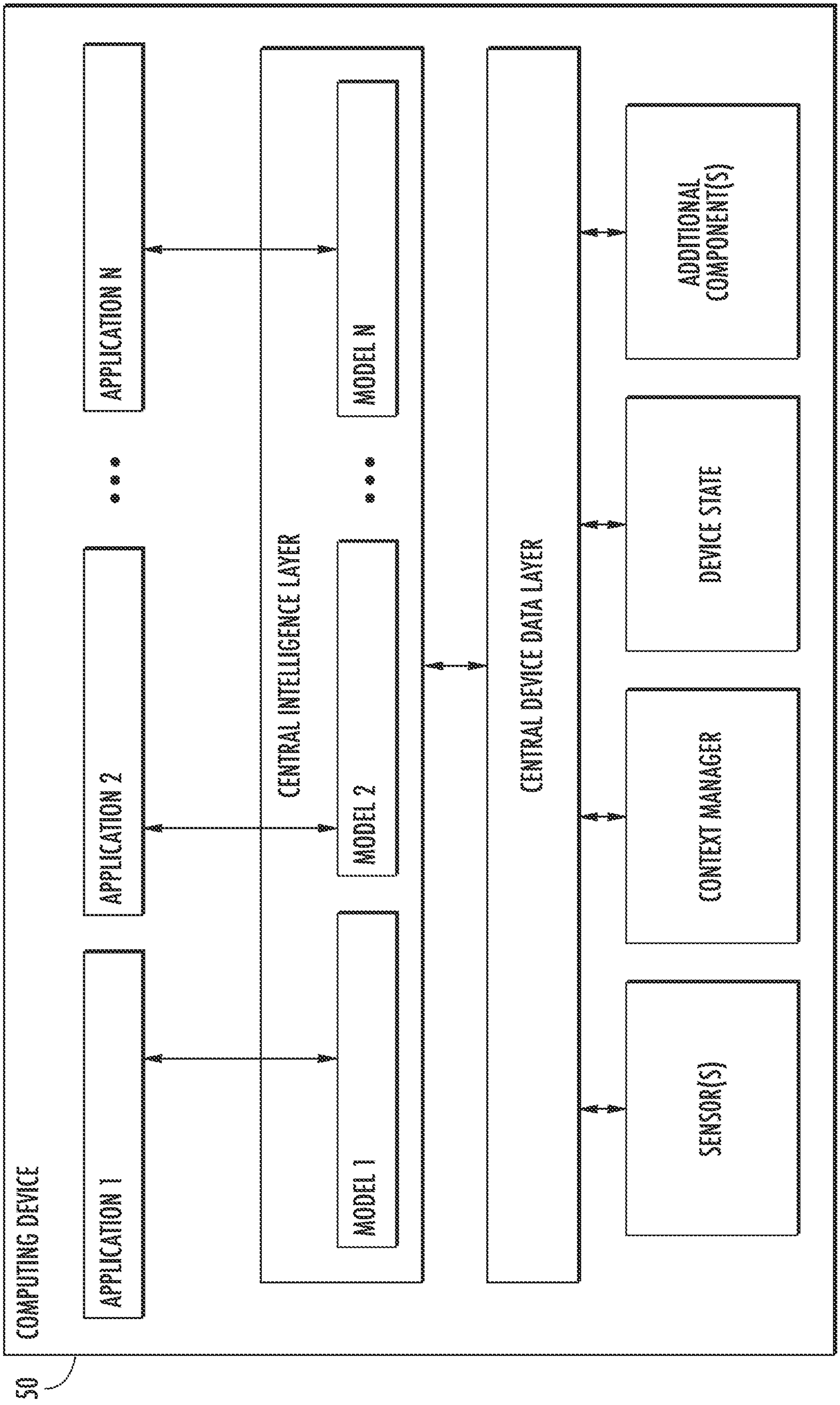
FIG. 1C depicts a block diagram of an example computing device that generates personalized and structured content using generative models according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
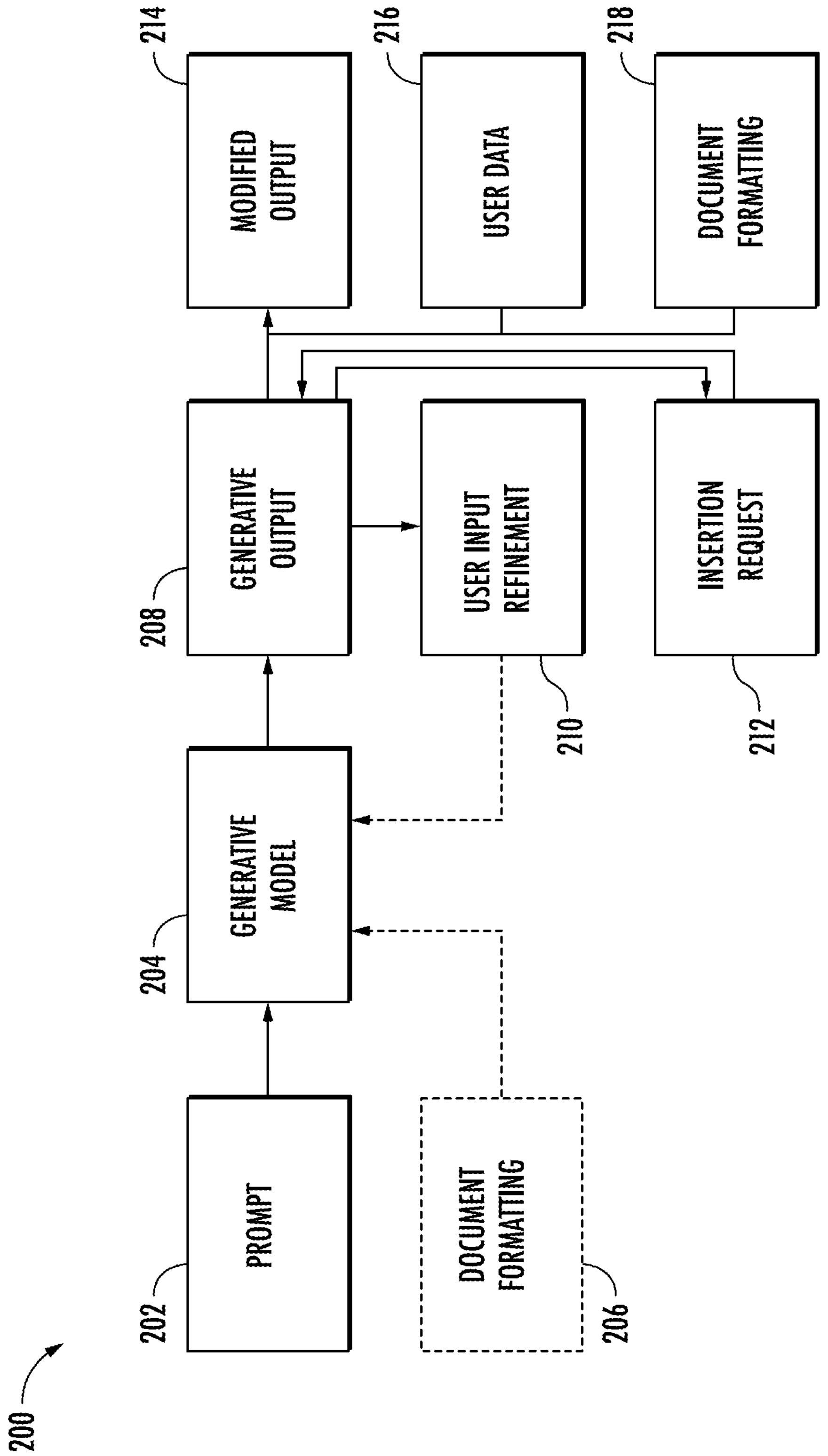
FIG. 2 depicts a block diagram of an example of personalized and structured content generation using generative models according to example embodiments of the present disclosure.

FIG. 2 depicts a block diagram of an example 200 for generating personalized and structured content using generative models according to example embodiments of the present disclosure. In particular, input data 202, such as a prompt, (e.g., a plurality of input characters descriptive of a prompt request) can be obtained by a machine-learned model 204 from a user based on interaction of the user with the user interface 142 via the user interface component(s) 122. The prompt 202 may be in the form of natural language, a combination of natural language and another form(s) (e.g., image), or any other suitable form(s).

In some instances, as will be described in greater detail below, the machine-learned model 204 may be accessible from within an integrated development environment (e.g., word processor, and/or the like). For example, the prompt 202 may be selected from content existing within the integrated development environment, content newly generated within the integrated development environment (e.g., within a prompt window provided within the integrated development environment interface), and/or the like. As will also be described in greater detail below, in some implementations, document formatting rules 206 for the integrated development environment may also be provided with the prompt 202 to the generative model 204, where the generative model 204 may pass such formatting rules 206 along with any output.

In some implementations, the prompt 202 can be processed by one or more machine-learned generative models 204 to determine an intent of the prompt 202 and generate a generative output 208 responsive to the prompt 202. For instance, the generative model 204 can include any of the model(s) 120, 140 described above with reference to FIGS. 1A-1C, such as one or more transformer models, may include one or more autoregressive language models, may include one or more stable diffusion models, and/or the like. The generative output 208 may include text data, image data, audio data, latent encoding data, and/or statistical data.

The success of the generative output 208 may be evaluated. For example, in some implementations, a user interface (e.g., the user interface 142) may be utilized to receive refinement feedback 210 from the user regarding editing (e.g., refining) one or more parts of the generative output 208 or generating a new generative output 208 (e.g., re-submitting the prompt 202 to the generative model 204, with the generative model 204 providing non-deterministic outputs). The generative model 204 may then refine the existing generative output or generate a new generative output in response to the feedback 210.

If no refinement feedback 210 is received, or once the refinement feedback 210 has been addressed, an insertion request 212 may be received from the user via a user interface (e.g., the user interface 142) to insert the generative output 208 into the integrated development environment. In some instances, the generative output 208 has one or more fields corresponding to personal user information (e.g., fields for a user's name, contact information, contacts, calendar events, or associated locations) or other unknown information (e.g., event details, and/or the like). As the generative model 204 is only trained using general information (not information specific to the user associated with the prompt) and relies on the prompt to provide specific details, such field(s) may be un-filled. Instead of requiring a user to manually populate such fields after the generative output 208 is inserted in-line within the integrated development environment, a computing system (e.g., server computing system 130 and/or user computing device 102) may generate a modified output 214 based on the generative output 208 and personal, historical user data 216 (e.g., stored and/or accessed from memory 134, memory 116, etc.). For instance, the computing system may create the modified output 214 by automatically populating fields defined within the generative output 208 with appropriate user information 216. For example, the modified output 214 may populate a "user name" field in the generative output 208 with a user's name. As such, the generative output 208 may be automatically personalized, separate from the model 204, to create the modified output 214, where the modified output 214 may then be inserted in-line within the integrated development environment, without requiring manual user population or entry of the user information-related fields.

Similarly, in some instances, the generative model 204 may not be configured to format the generative output 208. For example, the generative model 204 may be trained only to provide the generative content 208 within a particular structure (e.g., paragraph form, tabular form, list form, and/or the like), where the structure may be generated by the generative model 204 or selected from a known structure, but the generative model 204 may not be constrained to providing the generative content 208 according to formatting rules (e.g., a particular font, font size, emphasis (e.g., highlight, bold, italic, underlined, strike-throughs, etc.)), let alone the formatting rules of the intended insertion environment (e.g., the integrated development environment). As such, before insertion, a computing system (e.g., server computing system 130) may additionally, or alternatively, be configured to generate the modified output 214) based on the generative output 208 and formatting rules (e.g., such as formatting rules set within the intended insertion environment). For instance, the computing system may create the modified output 214, outside of the generative model 204, by automatically formatting the generative output 208 according to formatting rules. For example, the generative output 208 may have different content levels (e.g., headings, sub-headings, body, and/or the like) defined by the generative model 204 and/or otherwise parsed/identified by the computing system, where the computing system may apply the formatting rules defined for the different content levels to the different content levels within the generative output 208 to create the modified output 214, where the modified output 214 may then be inserted in-line within the integrated development environment. As such, the generative output 208 may be automatically formatted, outside of the model 204, to create the modified output 214, where the modified output 214 may then be inserted in-line within the integrated development environment while matching the formatting within the integrated development environment and without requiring manual user adjustment.

Figure 3:
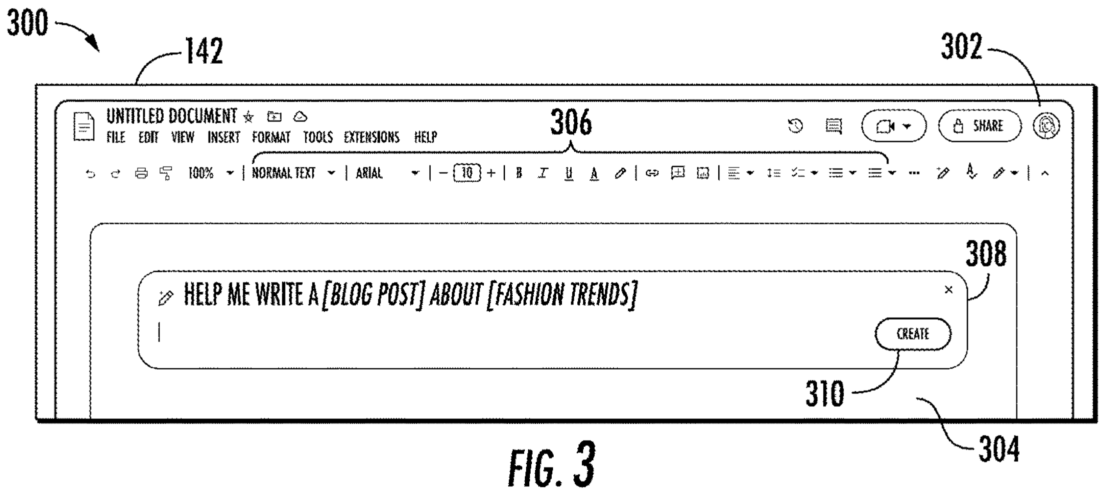
FIG. 3 depicts an illustration of an example interface for interacting with a generative model for generating generative output content within a collaborative, integrated development environment according to example embodiments of the present disclosure.

FIG. 3 depicts an illustration of an example interface 300 for interacting with a generative model for generating generative output content within a collaborative, integrated development environment according to example embodiments of the present disclosure. In particular, the example interface 300 may include an integrated development environment 302 (e.g., word processor) accessible with the user interface 142 (e.g., via the user interface component(s) 122). The integrated development environment 302 may include a workspace 304 configured to receive inputs (e.g., text, images, and/or the like) from a user and provide or display such inputs in-line within the workspace 304. It should be appreciated that, as used herein, "in-line" is considered to mean content within or insertable into the workspace 304 such that it is subject to formatting rules of the workspace 304 and/or embedded into the workspace 304. For instance, the integrated development environment 302 may provide one or more format selection interface elements 306 with which a user may interact for selecting or defining formatting rules (e.g., content level (e.g., heading, sub-heading, normal body, etc.), font style, font size, font emphasis (e.g., bold, italicize, underline, color, highlight), paragraph style, numbering, bulleting, and/or the like) for content (e.g., text) in-line within the workspace 304.

The example interface 300 can be configured to receive a prompt (e.g., prompt 202 in FIG. 2) for submission to a generative model (e.g., model 204 from FIG. 2) from a user via the workspace 304 of the integrated development environment 302. For instance, as shown in the example of FIG. 3, the integrated development environment 302 has a generative area 308 broken-out or separated from the rest of the general workspace 304 by a box, where a user may type or otherwise provide the prompt within the generative area 308. Once the user has finished providing the prompt, the user may request that the prompt be submitted or otherwise provided to a generative model by pressing enter or clicking a request button 310 (e.g., button labeled "create") associated with the generative area 308. After the model has generated generative content responsive to the prompt, the model may display the generative content within the integrated development environment 302 (e.g., within the generative area 308).

Figure 4A:
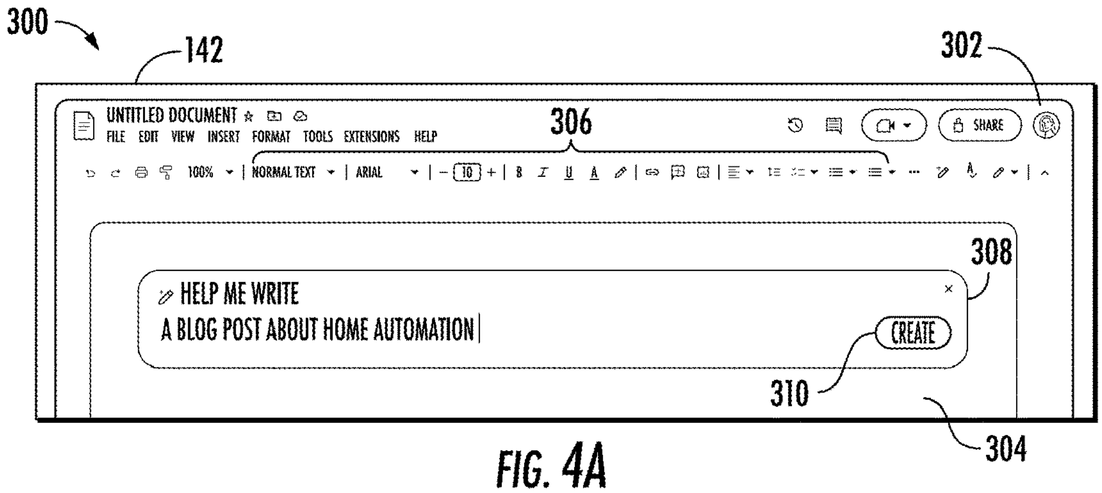
FIGS. 4A and 4B depict illustrations of an example interface interaction for providing a prompt to a generative model for generating generative output content and receiving a generative output from such generative model in response to the prompt according to example embodiments of the present disclosure.
Figure 4B:
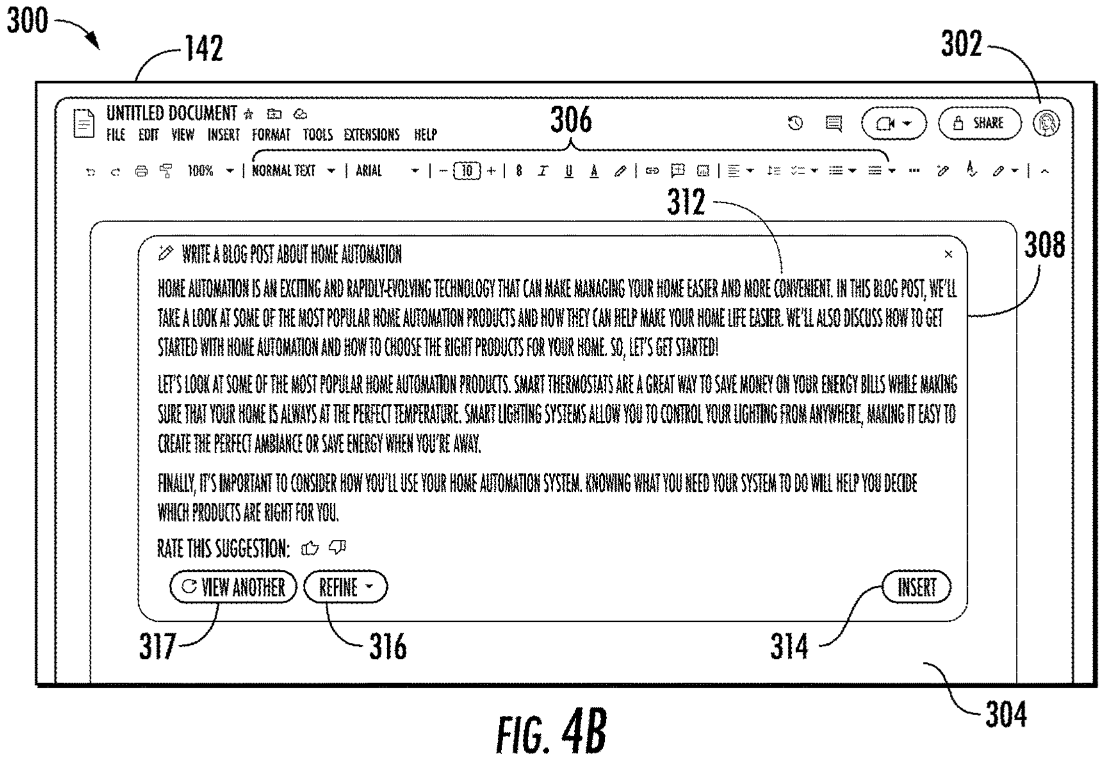

For instance, FIGS. 4A and 4B depict illustrations of an example interface interaction for providing a prompt to a generative model for generating generative output content and receiving a generative output from such generative model in response to the prompt according to example embodiments of the present disclosure. As particularly shown in FIG. 4A, a user has provided a prompt "Help me write. . . . A blog post about home automation," within the generative area 308 and clicked the request button 310. In response to the prompt, the model provides a generative output 312 (e.g., a blog post about home automation) within the integrated development environment 302. Particularly, in some embodiments, it is preferred that the generative output 312 remains separate from in-line content within the rest of the general workspace 304 until a user requests insertion of the generative output 312 into the workspace 304. For instance, as shown in FIG. 4B, the generative output 312 is provided within the generative area 308, separate of in-line content within the rest of the general workspace 304. In some instances, the generative area 308 itself may appear in-line in the general workspace 304, or may appear above or in-front of in-line content within the general workspace 304. In one or more instances, the generative output 312 may be provided in-line with content within the general workspace 304, but visually separated from the other in-line content by different formatting (e.g., highlighting, bolding, italics, and/or the like) instead of by a box.

If a user approves of the generative output content 312 generated by the model, a user may then request that the generative output content 312 be inserted in-line within the general workspace 304. For instance, the user may press enter or click an insert button 314 associated with the generative area 308. Otherwise, a user may request refinement or replacement of the generative output 312. For example, a user may click a refinement request button 316 or a regeneration button 317 associated with the generative area 308, and thus, the generative content 312.

Figure 5:
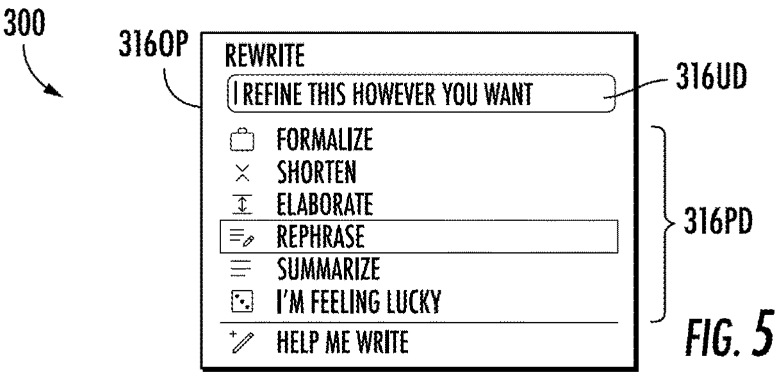
FIG. 5 depicts an illustration of an example interface for requesting refinement by a generative model of a generative output generated by the generative model according to example embodiments of the present disclosure.

If the user requests refinement by clicking the refinement request button 316, the user may be provided with different defined options for refining the generative content 312 or may provide an alternative refinement. For example, turning to FIG. 5, an illustration of an example interface for requesting refinement by a generative model of a generative output generated by the generative model according to example embodiments of the present disclosure. As shown in FIG. 5, the integrated development environment 302 may provide a list of refinement options 316OP. For instance, the list of refinement options 316OP may include one or more predefined refinement options 316PD associated with predefined parameters for refining the generative content 312, such as a formalize option (e.g., removing contractions, removing colloquialisms, etc.), a shorten option (e.g., reduce word count by a certain percentage), an elaborate option (e.g., increase word count by a certain percentage), a rephrase option (e.g., use different language, but same general content), a summarize option (e.g., provide one sentence summary), a randomized option (e.g., "I'm Feeling Lucky" to use the top-ranked method to refine, etc.). In some instances, the integrated development environment 302 may additionally, or alternatively, provide an open-ended request option for a user to provide any type of request for refinement (e.g., "make it funnier", "be more vague", "remove quotes", etc.). Once a user selects one of the predefined refinement options or otherwise provides a different refinement request, the model may refine the generative content 312 in light of the desired refinement and display the refined generative content within the integrated development environment 302 (e.g., within the generative area 308). For instance, the model may receive the desired refinement and the generative content 312 as input, and return the refined generative content.

Figure 6A:
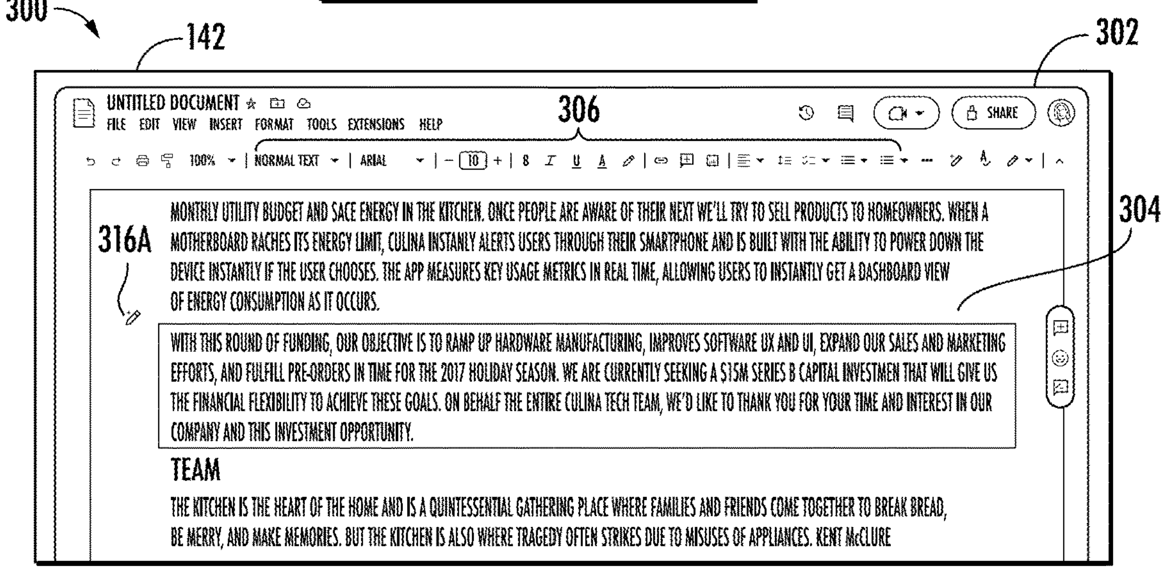
FIGS. 6A and 6B depict illustrations of another example interface interaction for providing a prompt to a generative model for generating generative output content and receiving the generative output from such generative model in response to the prompt according to example embodiments of the present disclosure.
Figure 6B:
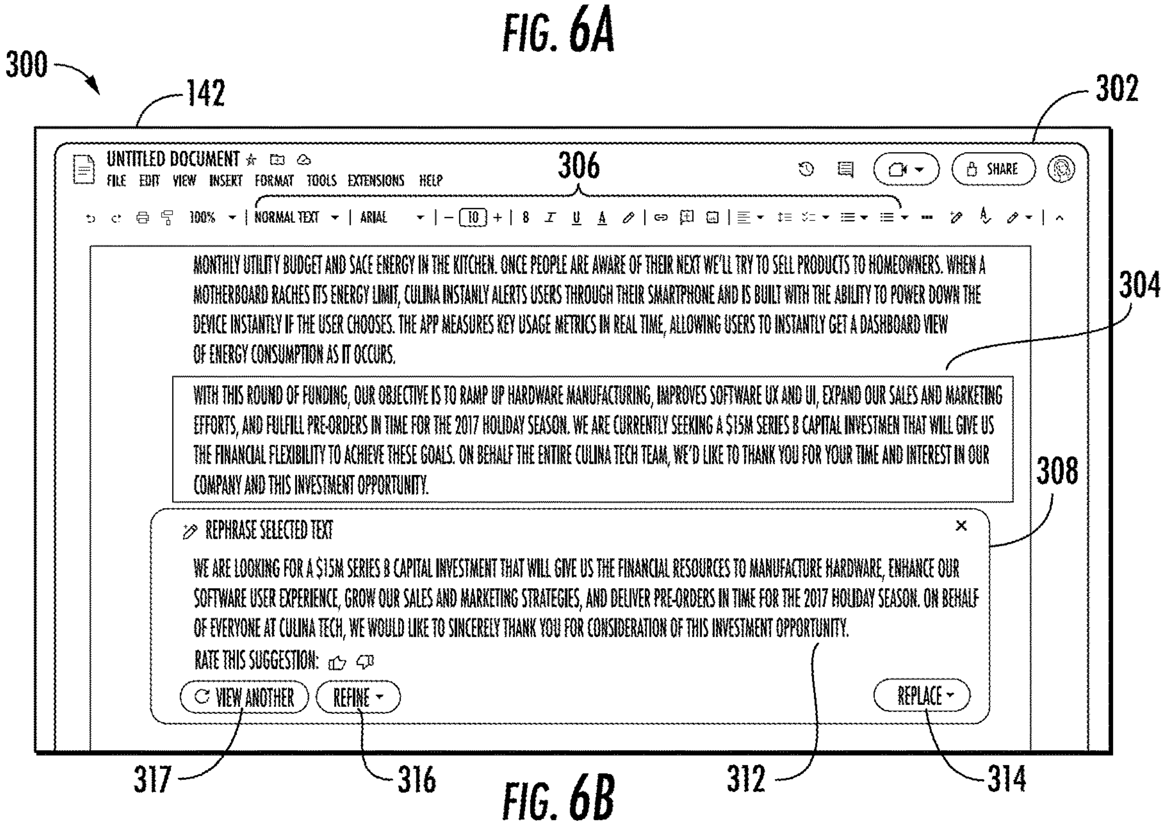

In some instances, a prompt may be provided to the model by selecting existing content within the general workspace 304. For instance, FIGS. 6A and 6B depict illustrations of another example interface interaction for providing a prompt to a generative model for generating generative output content and receiving the generative output from such generative model in response to the prompt according to example embodiments of the present disclosure. As particularly shown in FIGS. 6A and 6B, a user may highlight or otherwise select existing content (e.g., a paragraph) within the general workspace 304. In some instances, a new button (e.g., button 316A) may appear when a user highlights or otherwise selects existing content that allows a user to access the refinement options 316OP. However, it should be appreciated that the user may access the refinement options 316OP in any other suitable manner (e.g., by right-clicking on the selected text, and/or the like). Once a user clicks on one of the refinement options 316OP, the selected existing content may be submitted to the model with the requested refinement. For example, as shown FIG. 6B, the user requested that the selected paragraph be "rephrased" (e.g., the prompt within the generative area 308 reads "Rephrase selected text"), and the model returned output content 312 consisting of a rephrased version of the selected paragraph. Again, the output content 312 may be indicated or provided separately of in-line content within the general workspace 304, such as by being presented within the generative area 308, being formatted differently from in-line content within the general workspace 304, and/or the like. The user may request further refinement or replacement of the rephrased output content 312 using the buttons 316, 317, as described above. In cases where the selected existing content that was used as part of the prompt is to be replaced completely by the output content 312, the insert button 314 may be configured to replace the selected existing content with the output content 312 within the general workspace 304 instead of simply adding the output content to the general workspace 304.

It should be appreciated that, in some instances, when existing content is used as a prompt, the formatting of the existing content may be preserved. For instance, the formatting rules applied to the existing content (e.g., as selected using the formatting selection elements 306) may be embedded within the existing content, such that when the existing content is provided to the model, the model outputs the output content 312 and passes along the formatting rules with the output content 312, where the formatting rules passed along with the output content 312 may then be applied when subsequently inserting the output content 312 in-line within the general workspace 304, outside of the generative area 308. For example, when the rephrased generative output 312 shown in the generative area 308 FIG. 6B is requested to replace the existing content within the general workspace 304, the rephrased generative output 312 will be formatted (e.g., by the computing system(s) 102, 130, separately of the model) to match the formatting of the content being replaced (e.g., normal or body level content having Arial font, font size 10, etc.).

In one or more implementations, the generative content may include a building block at least partially populated by the model. The building block may include a structured template having fields or building blocks for specific information at particular relative positions. Common building blocks include email building blocks, meeting building blocks, code building blocks, workflow building blocks, and/or the like. The building blocks may be interactive, such that they may allow a user to quickly insert smart chips or intuitively labeled links to files, contacts, events, locations (e.g., maps, directions), etc. into fields after the block is inserted into the development environment. In some implementations, the building blocks may have dynamic blocks or dynamic fields that may be automatically updated when other updates are made to the building block or to related features within the destination environment (e.g., "last updated [MM/DD/YYYY]" or "posted [MM/DD/YYYY]" in an article). In some instances, the building blocks may be generated and/or selected by the model. It should be appreciated that the block template may implicitly or explicitly define such fields. Moreover, the different fields of the block templates may be used to parse the generative content for formatting. For instance, the different fields of the block templates may be assigned different content levels (e.g., title, heading, sub-heading, lists, etc.). Examples of building block templates will be described herein with reference to FIGS. 7A-12B.

In exemplary aspects of the present subject matter, the model is only configured to define or indicate that certain fields of templates are to be populated. For instance, in some implementations, the model is not passed or otherwise provided user information with the prompt. Particularly, the model is not provided historical, personal user information, such as a name of the user, contact information, contacts, calendar events, location history, and/or the like, unless it is provided within the prompt by the user. It should be appreciated that "historical user information" is used herein to mean user information defined during a separate interaction from the present request for generated content, such as an interaction before the prompt is provided. For instance, historical user information may be defined by a user during set-up of a user profile for use with the integrated development environment 302 or other environments linked, in communication with, or otherwise tied to the integrated development environment 302, may be learned based on interactions of the user within the development environment 302 or connected development environments (e.g., a user typing their name in fields that say "name"), and/or the like. The historical user information may be saved in the memory of a user computing device being used to interact with the integrated development environment (e.g., memory 114 of user computing device 102 in FIG. 1) and/or in the memory of a server computing system hosting the user interface for accessing the integrated development environment (e.g., memory 134 of server computing system 130 in FIG. 1), and/or may otherwise be accessible by such server computing system. As the model does not have user information, the model provides or defines variables or fields within the template for such information to be populated separately of the generative content being created, for instance, for population by the server computing system hosting the integrated development environment (e.g., by server computing system 130 in FIG. 1).

Figure 7A:
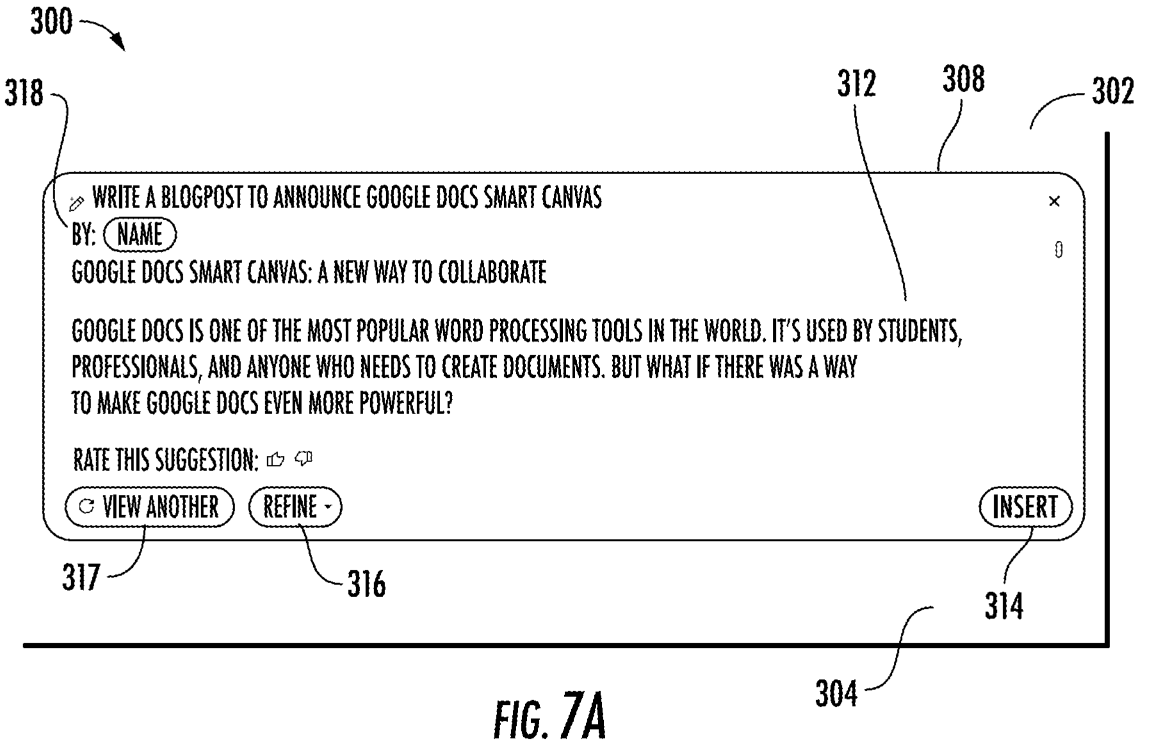
FIGS. 7A and 7B depict illustrations of example interfaces for providing a generative output in response to a prompt to a generative model for generating output content and providing an example modified output inserted within the integrated development environment according to example embodiments of the present disclosure, the modified output being generated based on the generative output and user data.
Figure 7B:
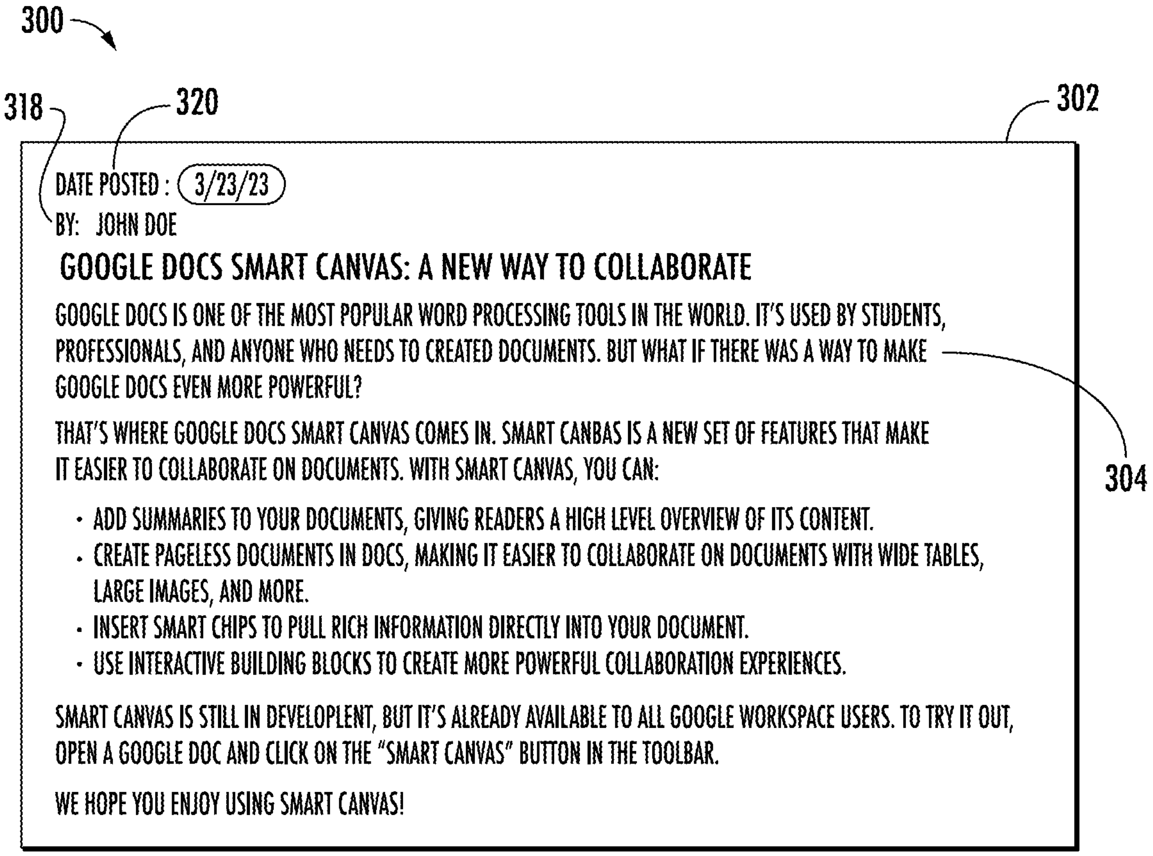

For instance, referring now to FIGS. 7A and 7B, illustrations of example interfaces for providing a generative output in response to a prompt to a generative model for generating output content and providing an example modified output inserted within the integrated development environment are illustrated according to example embodiments of the present disclosure. Particularly, as shown in FIG. 7A, the example prompt requested the model to write a blogpost (e.g., "Write a blogpost to announce Google Docs smart canvas"). The generative content 312 generated by the model includes content (e.g., text) that is inserted into a block template particularly configured for blogposts. The block template for blogposts is selected from templates or generated by the model based on training of the model on blogposts, for example. As shown in the preview of the generative content 312 within the generative area 308 in FIG. 7A, the block template implicitly includes a by-line (e.g., "By:"), a title (e.g., "Google Docs Smart Canvas: A New Way to Collaborate"), body content including an introductory paragraph or hook (e.g., "Google Docs is one of the most popular word processing tools . . . But what if there was a way to make Google Docs even more powerful?"). The template also defines a field 318 in the by-line to be filled at a later time with the name of the user, in addition to defining a dynamic block or field (not shown) to be filled at a later time with the time of posting the blogpost. It should be appreciated that the template may define any other suitable dynamic block(s) or field(s) to be filled at a later time, such as for other identifying information of the user (e.g., job title, employer, and/or the like) or for any other suitable information identified by the template and responsive to the prompt.

When the user is satisfied with the generative content 312, other than fields being unpopulated, the user requests the generative content 312 to be inserted within the integrated development environment 302 (e.g., by clicking the insert button 314 within the generative area 308). Before being inserted into the general workspace 304 of the integrated development environment 302, the generative content 312 may be modified (e.g., by the server computing system 130 and/or the user computing device 102) based on the historical user data and based on the formatting rules of the development environment 302. For instance, eligible fields within the generative content 312 may be populated based on user data. For example, as particularly shown in FIG. 7B, after the generative content 312 has been modified then inserted into the workspace 304, the by-line field 318 is shown as being populated with the user's name (e.g., "John Doe"), the date posted field 320 is shown as being dynamically populated with the date (e.g., "Mar. 23, 2023"), and the content has been formatted according to the environment formatting rules (e.g., title is bold and in larger font than body content, etc.).

Figure 8A:
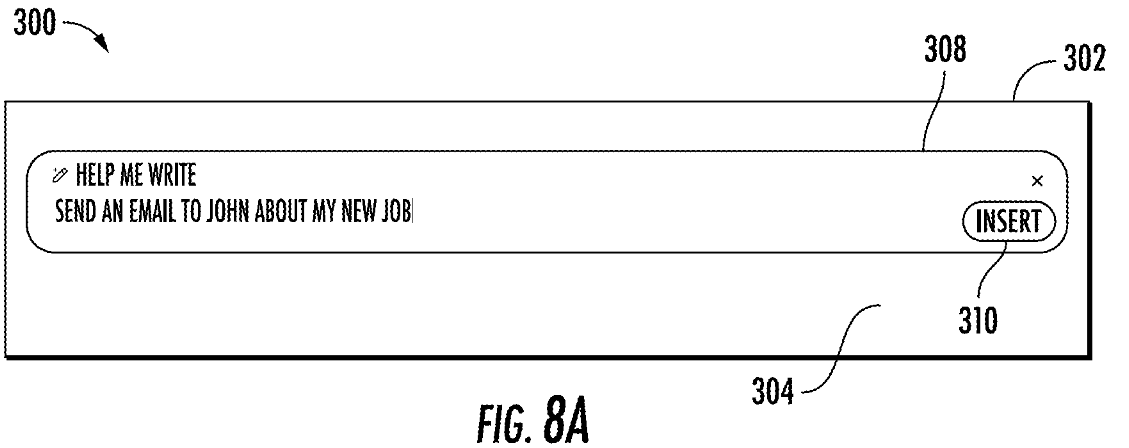
FIGS. 8A and 8B depict illustrations of further example interfaces for providing a prompt to a generative model for generating generative output content and providing an example modified output inserted within the integrated development environment according to example embodiments of the present disclosure, the modified output being generated based on user data and based on a generative output generated by the generative model in response to the prompt.
Figure 8B:
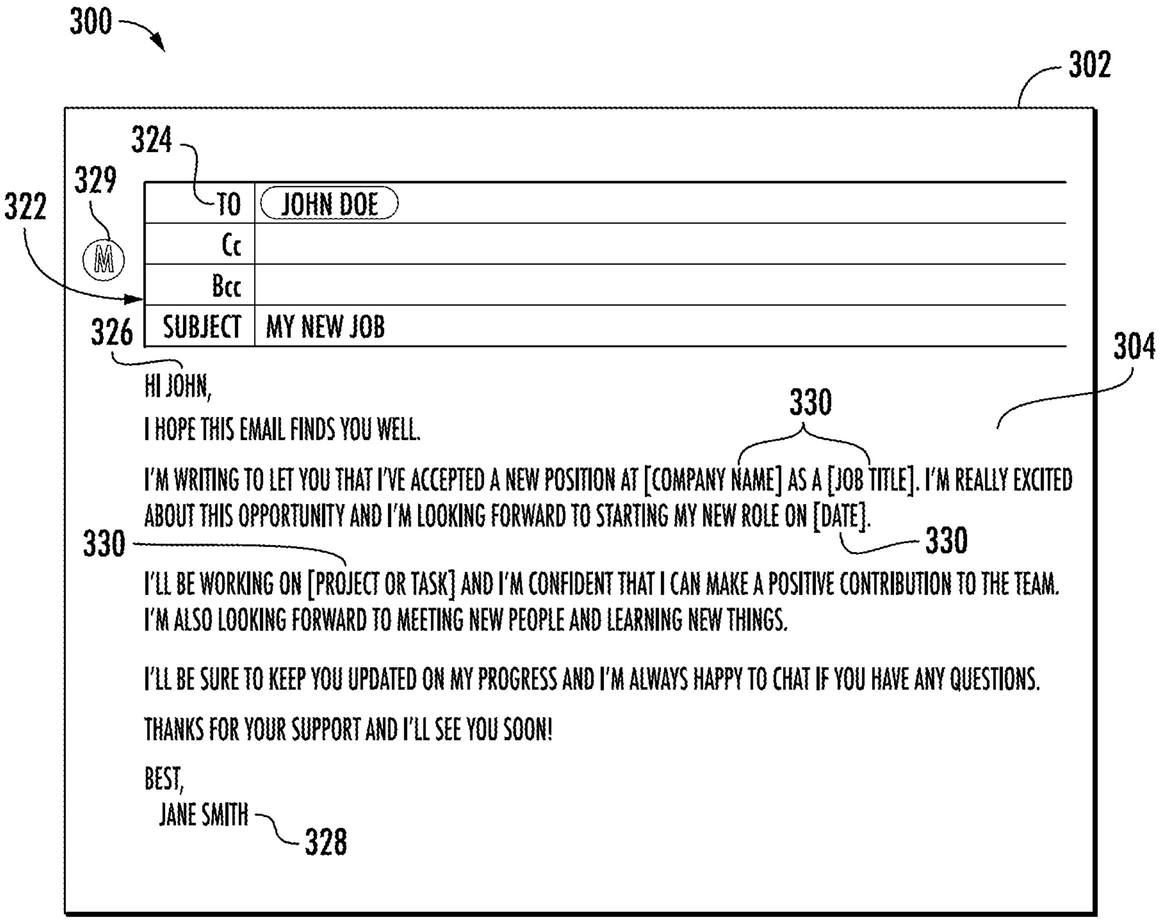

Similarly, FIGS. 8A and 8B depict illustrations of further example interfaces for providing a prompt to a generative model for generating generative output content and providing an example modified output inserted within the integrated development environment according to example embodiments of the present disclosure, the modified output being generated based on user data and based on a generative output generated by the generative model in response to the prompt. In the example of FIGS. 8A and 8B, the prompt requests an email from the model (e.g., "send an email to John about my new job" in generative area 308 in FIG. 8A). In return, the model provides an email block, which may be inserted into the generative environment. The email block may include common fields for an email, such as explicit fields including "To", "Cc", "Bcc", "Subject", in addition to implicit fields (e.g., body having a greetings line "Hi ______", body content, and by-line "Best, ______"). The model may identify content from the prompt for automatically populating certain fields. For instance, the model may identify the "Subject" as being "My new job" based on language in the prompt (e.g., "about my new job"), and automatically populate the "Subject" field accordingly. However, the model may have insufficient information to populate some fields. For instance, the model may identify that the "To" is someone named "John," but does not know any details about John, such as an email address for John. Thus, the model may pass "John" along with a defined unpopulated field for the "To" line requesting an email address with the email block. Similarly, the model may identify that "Best, ______" is associated with the user, but does not know the user's name. Thus, the model may define an unpopulated field for the user's name in the by-line.

The email block 322 shown in FIG. 8B illustrates a such an email block provided by the model and modified (e.g., further populated) with user information after a user requests insertion of such email block into the general workspace 304. Particularly, the email block 322 includes explicit fields within a table such as "To," "Cc", "Bcc", "Subject", in addition to implicit fields (e.g., body having a greetings line "Hi ______", body content, and by-line "Best, ______"). Certain fields have been populated by the computing system (e.g., by the server computing system 130 and/or the user computing system 102). For example, the "To" field 324 has been populated with a smart chip or link to an email address for the recipient (e.g., for "John Doc") based on the user's contacts (e.g., automatically selected from recent contacts). The greetings field 326 has similarly been populated with the recipient's name (e.g., "Hi John") based on the user's contacts. Moreover, the by-line field 328 has been populated with the user's name (e.g., "Best, Jane Smith") based on the user information. Additional fields 330 (e.g., company name, job title, start date, and project or task) that are not able to be filled based on the user's information or the prompt are emphasized (e.g., with brackets) within the email block 322 for a user to manually modify within the block positioned in the general workspace 304. When the user is ready for the email to be sent to the recipient(s), the user may press a send button 329 provided within the workspace 304.

Figure 9A:
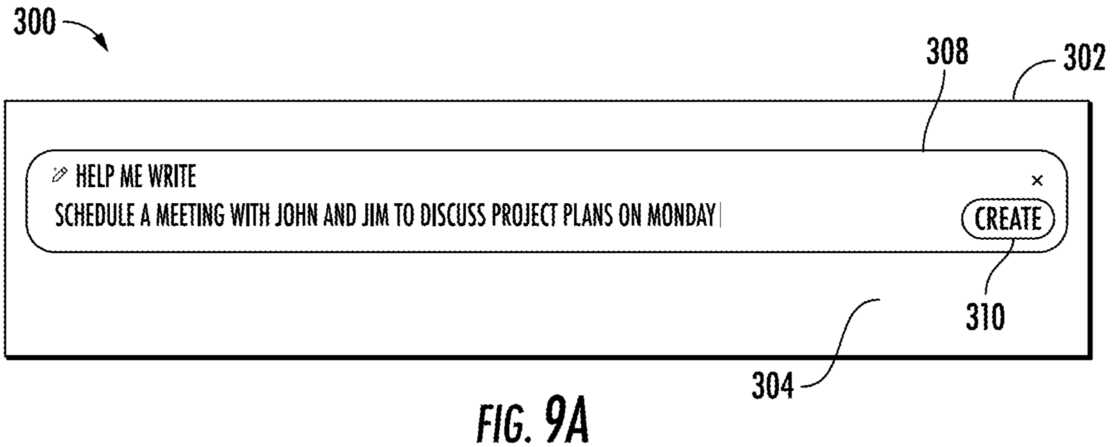
FIGS. 9A and 9B depict illustrations of other example interfaces for providing a prompt to a generative model for generating content and providing an example modified output inserted within the integrated development environment according to example embodiments of the present disclosure, the modified output being generated based on user data and based on a generative output generated by the generative model in response to the prompt.
Figure 9B:
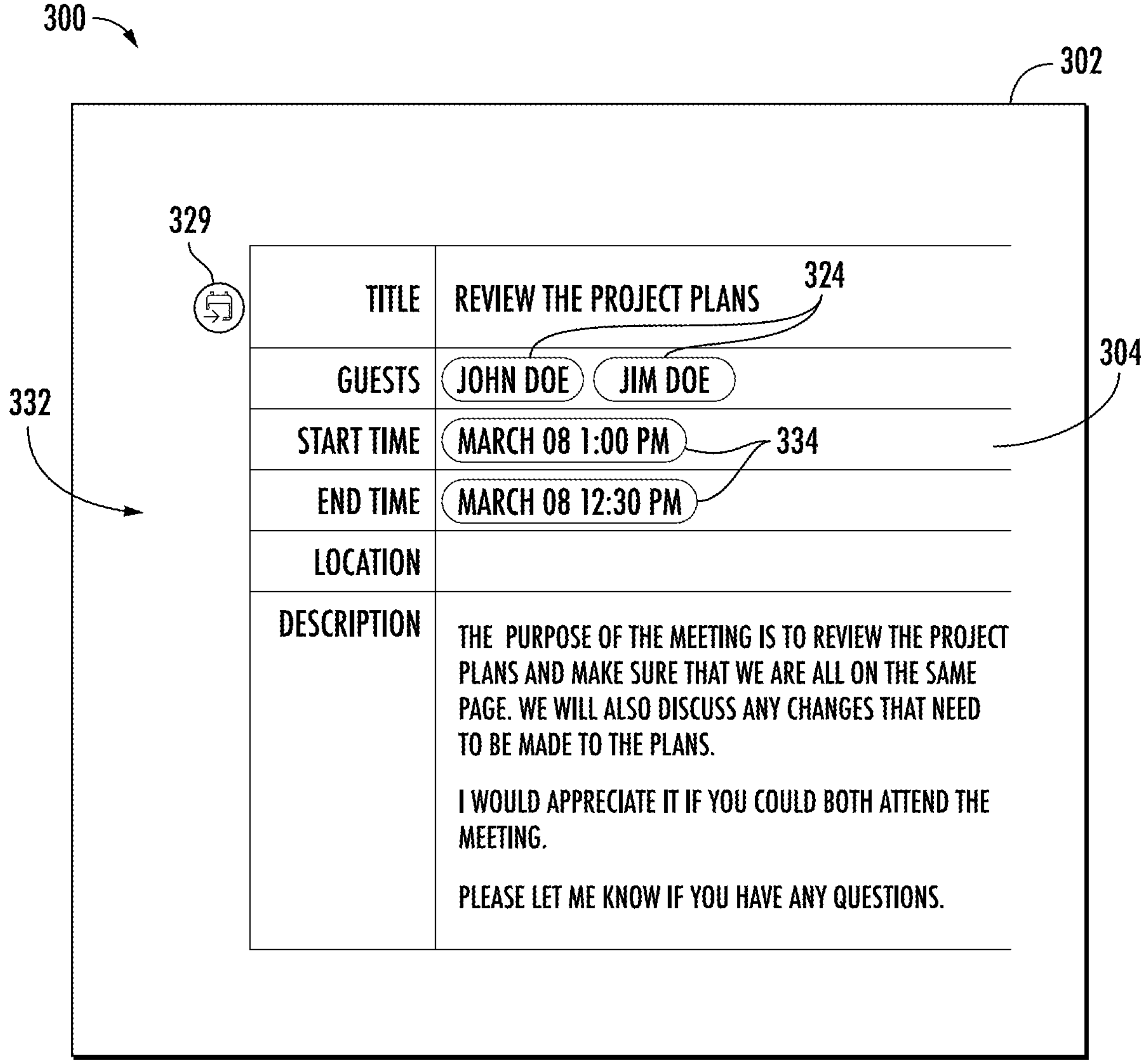

FIGS. 9A and 9B depict illustrations of other example interfaces for providing a prompt to a generative model for generating content and providing an example modified output inserted within the integrated development environment according to example embodiments of the present disclosure, the modified output being generated based on user data and based on a generative output generated by the generative model in response to the prompt. In the example of FIGS. 9A and 9B, the prompt requests a meeting from the model (e.g., "Schedule a meeting with John and Jim to discuss project plans on Monday" in generative area 308 in FIG. 9A). In return, the model provides a meeting block, which may be inserted into the generative environment. The meeting block may include common fields for a meeting, such as explicit fields including "Title", "Guests", "Start time" "End time", "Location", and "Description". However, the meeting block may include any other fields, explicitly or implicitly. The model may identify content from the prompt for automatically populating certain fields. For instance, the model may identify the "Title" as being "Review the project plans" based on language in the prompt (e.g., "to discuss project plans"), and automatically populate the "Title" field accordingly. However, the model may have insufficient information to populate some fields. For instance, the model may identify that the "Guests" includes someone named "John" and another someone named "Jim," but does not know any details about John or Jim, such as email addresses for John and Jim. Similarly, the model may identify the "Start time" and "End time" as generally being on the next Monday (e.g., "March 08"), but may not know a time to schedule the start and end times on Monday. Thus, the model may pass "John" and "Jim" along with a defined unpopulated field for the "Guests" line requesting email addresses with the meeting block. Similarly, the model may define unpopulated fields for the start and end times, and well as for a location. Additionally, the description may be populated by the model with content generated by the model based on the prompt.

The meeting block 332 shown in FIG. 9B illustrates such a meeting block provided by the model and modified (e.g., further populated) with user information after a user requests insertion of such a meeting block into the general workspace 304. Particularly, the meeting block 332 includes explicit fields within a table such as "Title", "Guests", "Start time" "End time", "Location", and "Description". Certain fields have been populated by the computing system (e.g., by the server computing system 130 and/or the user computing system 102). For example, the "Guests" field 324 has been further populated with smart chips or links to email addresses for the recipients (e.g., for "John Doe" and for "Jim Doc") based on the user's contacts (e.g., automatically selected from recent contacts). The start and end times fields 334 may be similarly populated with the start and end times, for example, based on available times determined from the user's calendar. When the user is ready for the meeting to be sent to the recipient(s), the user may press the send button 329 provided within the workspace 304.

Figure 10A:
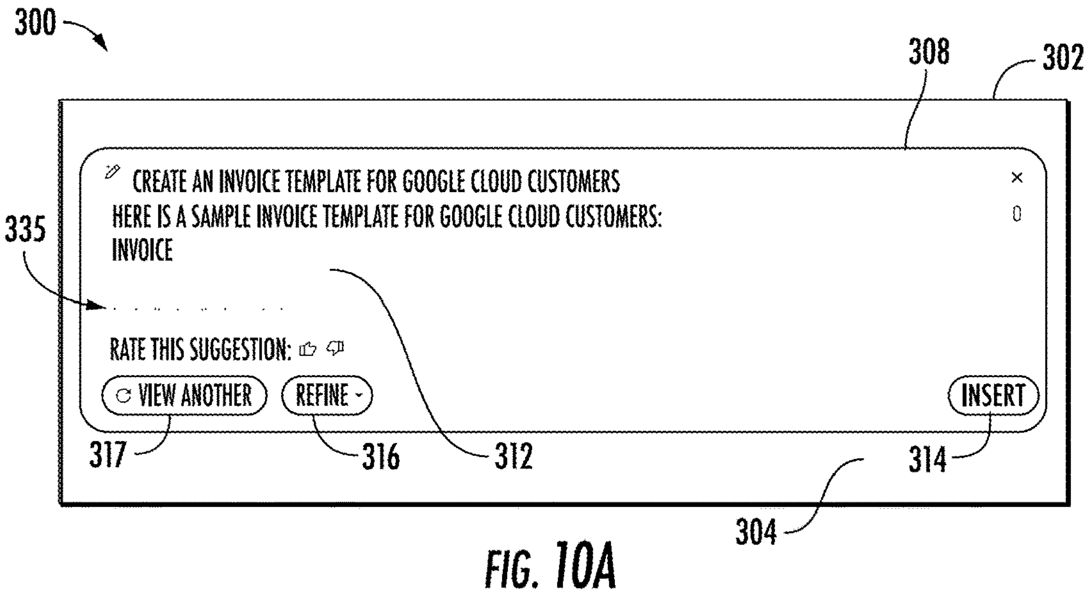
FIGS. 10A and 10B depict illustrations of additional example interfaces for providing a generative output in response to a prompt to a generative model for generating generative output content and providing an example modified output inserted within the integrated development environment according to example embodiments of the present disclosure, the modified output being generated based on the generative output and user data.
Figure 10B:
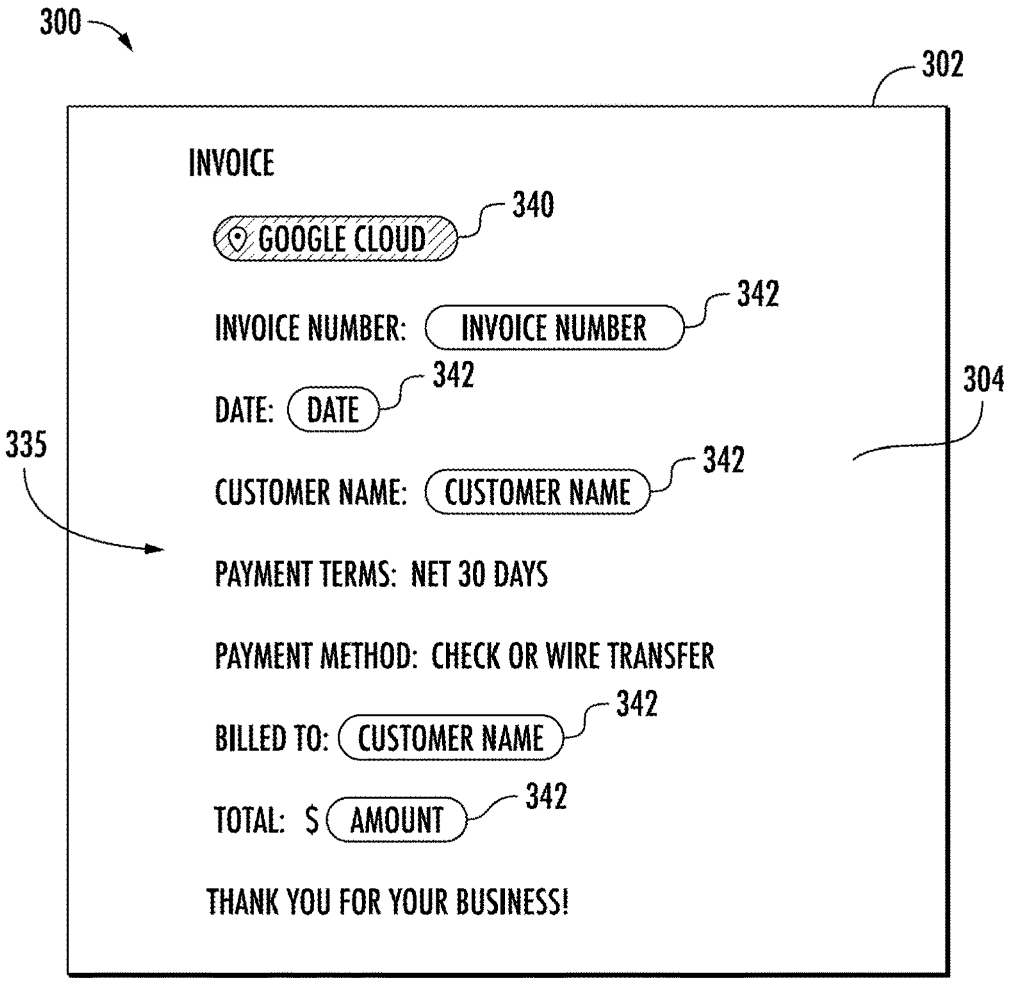

FIGS. 10A and 10B depict illustrations of additional example interfaces for providing a generative output in response to a prompt to a generative model for generating generative output content and providing an example modified output inserted within the integrated development environment according to example embodiments of the present disclosure, the modified output being generated based on the generative output and user data. Particularly, as shown in FIG. 10A, the example prompt requested the model to create an invoice template (e.g., "Create an invoice template for Google Cloud customers"). The generative content 312 generated by the model includes content (e.g., text) that is inserted into a block template 335 particularly configured for invoices. The block template 335 for invoices is selected from templates or generated by the model based on training of the model on invoices, for example. As shown in the preview of the generative content 312 within the generative area 308 in FIG. 10A, the block template 335 implicitly includes a summary line (e.g., "Here is a sample invoice template for Google Cloud customers:"), a title (e.g., "Invoice"), and body content. While not shown in the preview in FIG. 10A, the invoice 335 may include smart chip fields for the company requesting payment, an invoice number, a date of invoice, a customer name, payment terms, payment method, billing address, total invoiced amount, a greeting, and/or the like. The model may automatically fill one or more of the fields based on the prompt. Otherwise, the model may pass along information that may be used to fill the field(s). For instance, from the prompt, the model may know that the company requesting payment is "Google Cloud," however, the model may not have additional information (e.g., address, contact information, etc.). As such, the model may pass along such information (e.g., "Google Cloud") with the unpopulated field in the invoice template block 335.

When the user is satisfied with the generative content 312, the user requests the generative content 312 to be inserted within the integrated development environment 302 (e.g., by clicking the insert button 314). Before being inserted into the general workspace 304 of the integrated development environment 302, the generative content 312 may be modified (e.g., by the server computing system 130 and/or the user computing system 102) based on the formatting rules of the development environment 302, and to populate known fields. For instance, as particularly shown in FIG. 10B, after the generative content 312 has been modified then inserted into the workspace 304, the company requesting payment field 340 within the block 335 is shown as being populated with a smart chip for the company (e.g., a smart chip hyperlinking the billing location and/or directions to a physical or mailing address for Google Cloud and intuitively labeled "Google"). The further templated fields 342 may allow a user to easily populate remaining information for individual invoices.

Figure 11A:
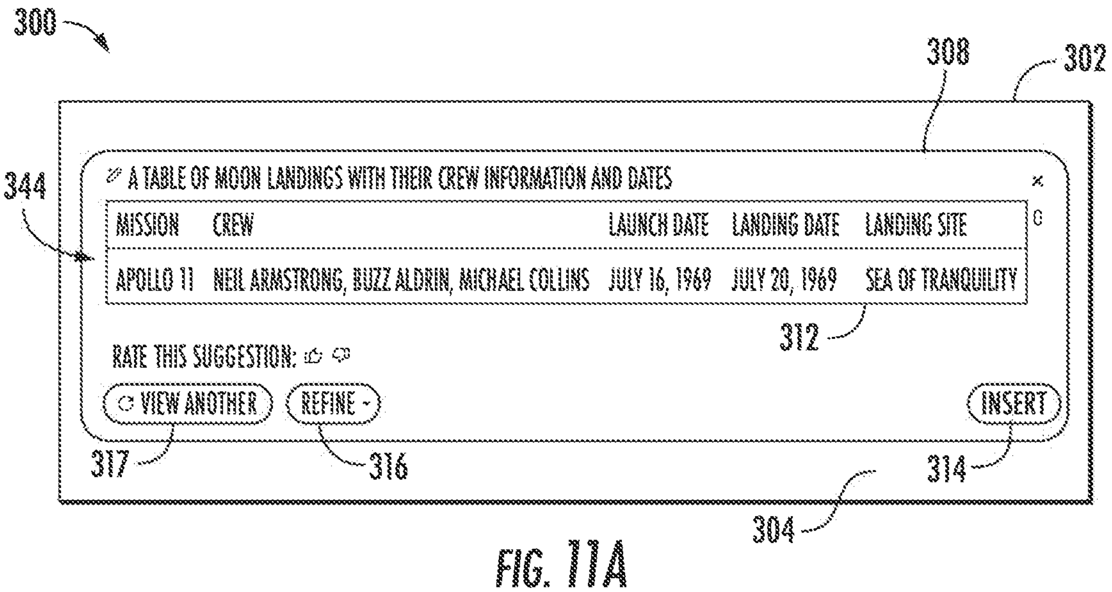
FIGS. 11A and 11B depict illustrations of example interfaces for providing a generative output in response to a prompt to a generative model for generating generative output content and providing an example modified output generated based on the generative output and structured formatting rules according to example embodiments of the present disclosure.
Figure 11B:
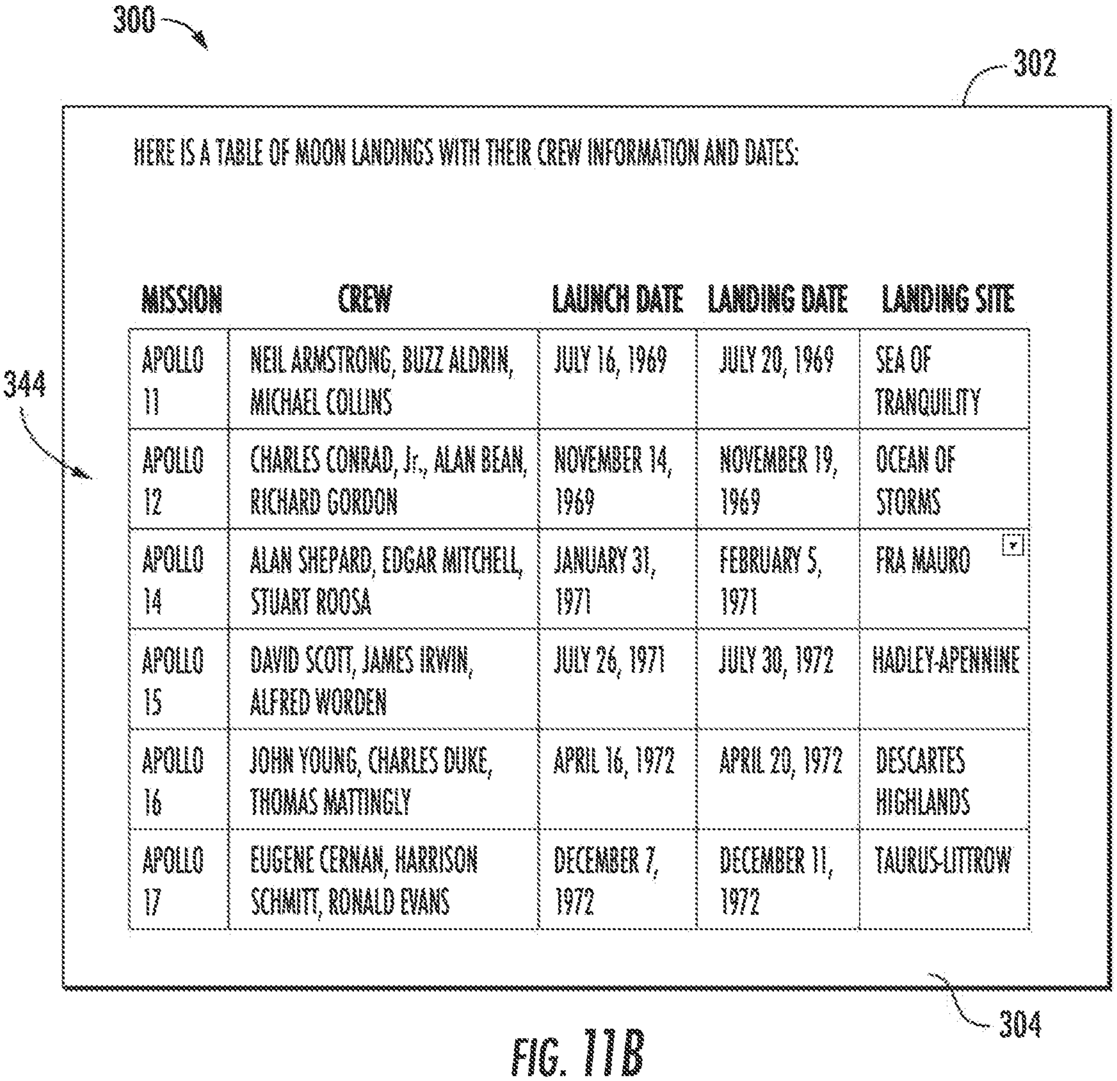

FIGS. 11A and 11B depict illustrations of example interfaces for providing a generative output in response to a prompt to a generative model for generating generative output content and providing an example modified output generated based on the generative output and structured formatting rules according to example embodiments of the present disclosure. For instance, as shown in FIG. 11A, the prompt requests a table from the model (e.g., "A table of moon landings with their crew information and dates"). The generative content 312 generated by the model includes content (e.g., text) that is inserted into a block template, particularly a table. The block template 344 for the table is selected from templates or generated by the model based on training of the model on similar tables, for example. As shown in the preview of the generative content 312 within the generative area 308 in FIG. 11A, the block template 344 explicitly includes a headings for columns of the table (e.g., "Mission", "Crew", "Launch Date", "Landing Date", and "Landing Site"), and body content in rows addressing such headers (e.g., "Apollo 11", "Neil Armstrong, Buzz Aldrin, Michael Collins" "Jul. 16, 1969", "Jul. 20, 1969", "Sea of Tranquility"). A user may request refinement or replacement using the buttons 316, 317 discussed above. For instance, a user may request removing or adding a column, reordering the columns, and/or the like.

When the user is satisfied with the generative content 312, the user requests the generative content 312 to be inserted within the integrated development environment 302 (e.g., by clicking the insert button 314 within the generative area 308). Before being inserted into the general workspace 304 of the integrated development environment 302, the generative content 312 may be modified (e.g., by the server computing system 130 and/or the user computing system 102) based on the formatting rules of the development environment 302. For instance, as particularly shown in FIG. 11B, after the generative content 312 has been modified then inserted into the workspace 304, the table 344 has been formatted with different font size, table margins, and table borders than was present in the preview within the generative area 308, to match the formatting rules of the workspace 304.

Figure 12A:
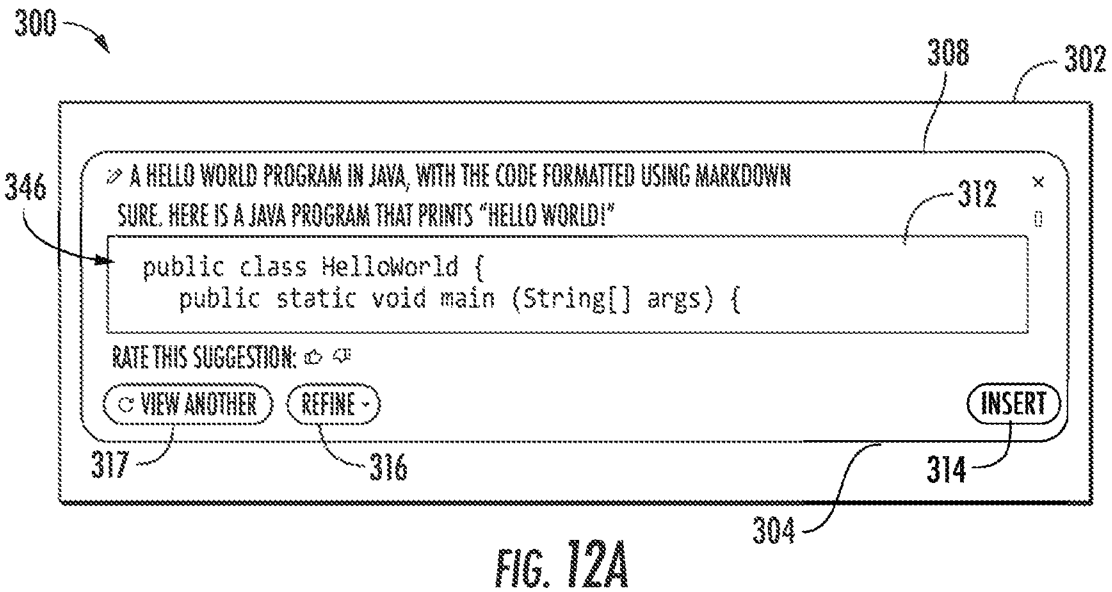
FIGS. 12A and 12B depict illustrations of example interfaces for providing a generative output in response to a prompt to a generative model for generating generative output content and providing an example modified output generated based on the generative output and structured formatting rules according to example embodiments of the present disclosure.
Figure 12B:
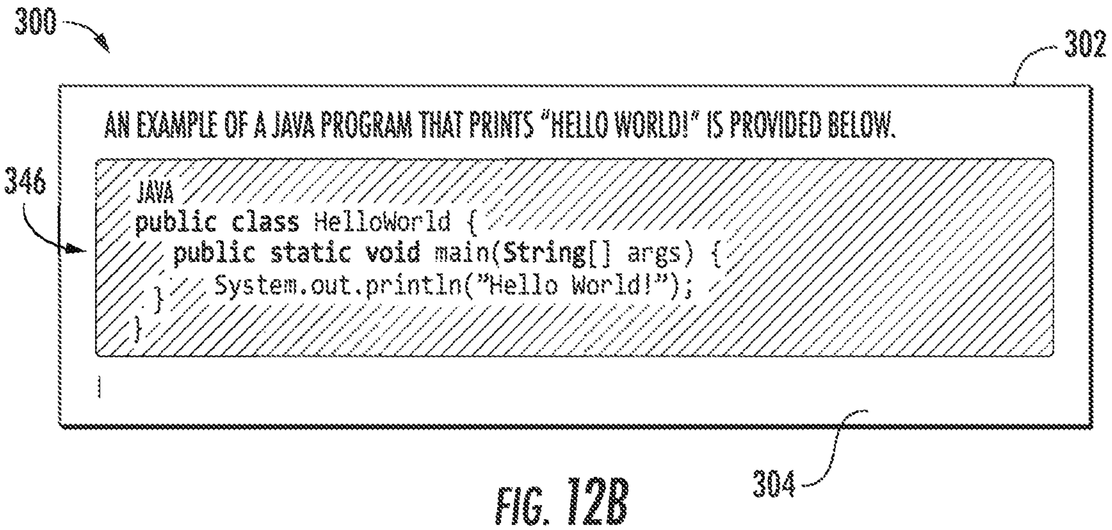

FIGS. 12A and 12B depict illustrations of example interfaces for providing a generative output in response to a prompt to a generative model for generating generative output content and providing an example modified output generated based on the generative output and structured formatting rules according to example embodiments of the present disclosure. For instance, as shown in FIG. 12A, the prompt requests code from the model (e.g., "a hello world program in java, with the code formatted using markdown"). The generative content 312 generated by the model includes content (e.g., code) that is inserted into a block template, particularly a code block 346. The block template 346 for the code is selected from templates or generated by the model based on training of the model on similar code blocks, for example. As shown in the preview of the generative content 312 within the generative area 308 in FIG. 12A, the block template 6 explicitly includes codes responsive to the prompt (e.g., "public class HelloWorld . . . "), and description of the code block 346 (e.g., "Sure. Here is a Java program that prints "Hello World!"). A user may request refinement or replacement of the code using the buttons 316, 317 discussed above. For instance, a user may request using a different coding language, request a different phrase, request additional output actions of the code, and/or the like.

When the user is satisfied with the generative content 312, the user requests the generative content 312 to be inserted within the integrated development environment 302 (e.g., by clicking the insert button 314 within the generative area 308). Before being inserted into the general workspace 304 of the integrated development environment 302, the generative content 312 may be modified (e.g., by the server computing system 130 and/or the user computing system 202) based on the formatting rules of the development environment 302. For instance, as particularly shown in FIG. 12B, after the generative content 312 has been modified then inserted into the workspace 304, the code block 346 has been formatted with different font size, background coloring, font coloring and/or the like than was present in the preview within the generative area 308, to match formatting of code in coding environments. When the development environment 302 is not a typical coding environment, such as when the development environment 302 is a word processing environment, the code block 346 may be formatted differently than in-line text generated within the workspace 304. For instance, as shown in FIG. 12B, the code block 346 is inserted in-line within the workspace 304, but is separated from other in-line content within the workspace 304 (e.g., "An example of a Java program that prints "Hello World!" is provided below.)" by a shaded box labeled with the coding language (e.g., "Java") and by different font styling (e.g., font style, font size, font coloring). The code block 346 may be formatted such that the code within the code block 346 or the entire code block 346 may be copied over to a typical coding environment. As such, it may be appreciated that code blocks, such as code block 346, may have separate formatting rules defined within the integrated development environment 302 than for general/semantic text.

The different examples of user interfaces and interactions described above with reference to FIGS. 3-12B may be combined or used separately to provide a way to generate personalized and structured content within a generative environment using generative models (e.g., large language models) in response to prompts received from within the integrated generative environment). Aspects of the present disclosure provide a number of technical effects and benefits. As one example technical effect and benefit, users of conventional generative models, separate of development environments (e.g., word processing applications, etc.) often must spend substantial quantities of time and effort navigating between the generative models and the development environment to generate generative content using the generative models, inserting the generative content into the development environment, personalizing the pasted generative content, and formatting the generative content, etc. However, by optimizing interactions between users, machine-learned large language models, and development environments, implementations of the present disclosure can substantially reduce the time required by users. In turn, this eliminates the expenditure of substantial quantities of computer resources that a user would otherwise use (e.g., compute cycles, power, memory, etc.). Further, by reducing the time expense of users, implementations of the present disclosure can increase efficiency across a number of use-cases (e.g., software engineering, medical research, citing documents for research papers, etc.). Moreover, as personal user data is not provided to the generative model, user privacy is protected. Additionally, as the generative model does not need to populate user information-based fields based on personal user data for each refinement/regeneration, and similarly, as the computing system only needs to populate the user information-based fields based on the personal user data after the generative model has been refined/regenerated, substantial quantities of computer resources (e.g., compute cycles, power, memory, etc.), that would otherwise be used by the generative model and/or computing system, are eliminated.

Example Methods

Figure 13:
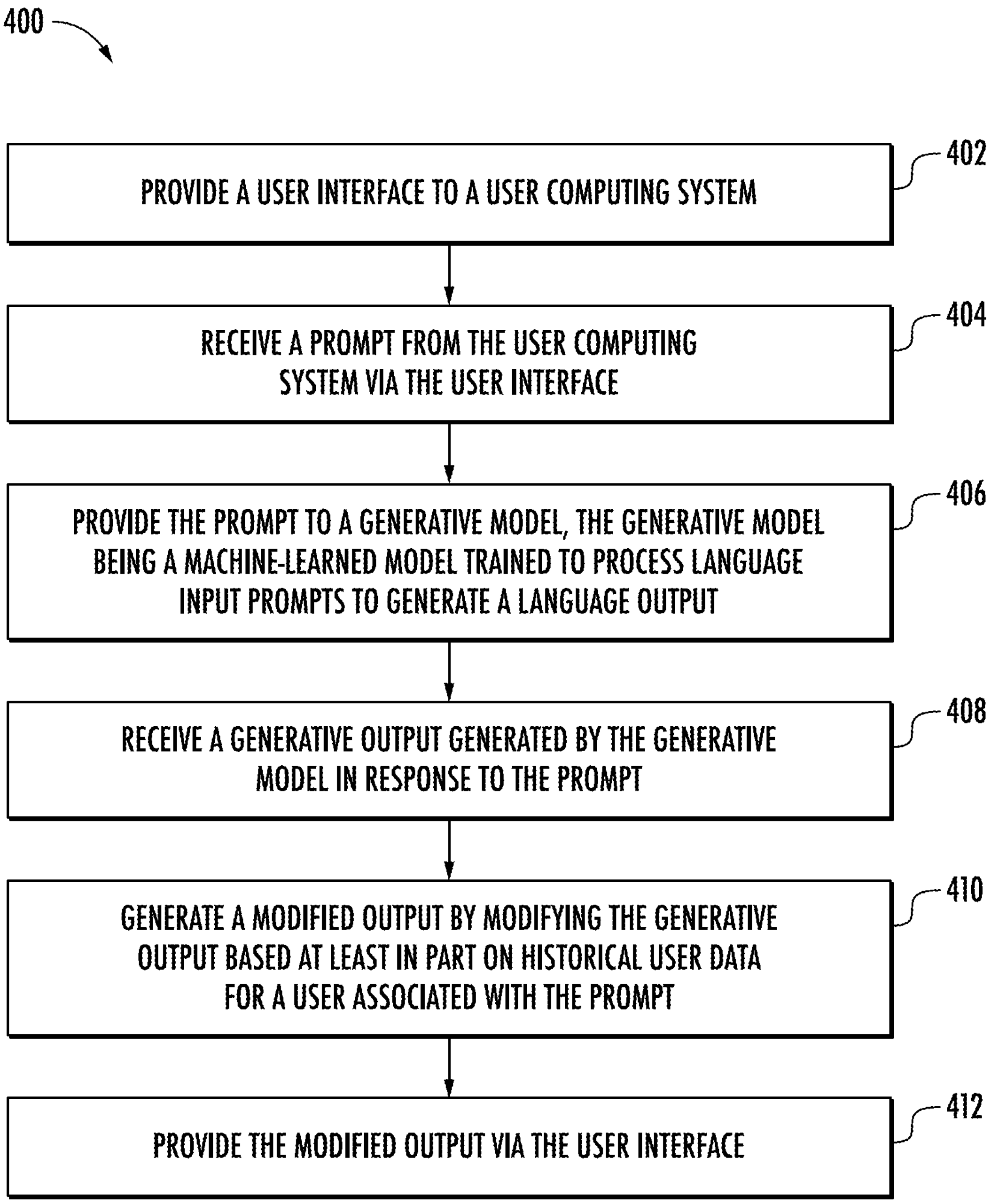
FIG. 13 depicts a flow chart diagram of an example method to generate personalized and structured content using generative models according to example embodiments of the present disclosure.

FIG. 13 depicts a flow chart diagram of an example method 400 to perform according to example embodiments of the present disclosure. Although FIG. 13 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system provides a user interface to a user computing system. For instance, as discussed above, the user interface can include an integrated development environment (e.g., environment 302) which may be displayed or otherwise provided on the user computing device (e.g., user computing device 102). The integrated development environment can be configured to receive a plurality of input characters (e.g., within generative area 308). The integrated development environment can be associated with a text-encoding system associated with a set of predetermined symbols associated with a set of formatting operators. For example, the integrated development environment may include a word processor. The integrated development environment may be an online word processor, stored or hosted on a server (e.g., server 130) and accessible by a user computing device (e.g., user computing device 102), or may be stored or hosted on a user computing device and have communication with a server. The integrated development environment 302 may allow multiple user computing device (s) 102 to access the workspace 304 simultaneously to allow for simultaneous or collaborative editing of content within the workspace 104 and generating of content via the generative area(s) 308.

Then, at 404, the computing system receives a prompt from the user computing system via the user interface. For example, as described above, a user may input a prompt within the user interface using one or more input devices of the user computing system (e.g., within the generative area 308 of the integrated development environment 302 using interface component(s) 122 of the user computing system 102). The prompt may include plurality of input characters descriptive of a user prompt request. The plurality of input characters can be descriptive of a natural language text string. Alternatively, and/or additionally, the plurality of input characters can include one or more syntax symbols. The syntax symbols may be associated with functions of the prompt-generation markup language and/or may be natural language syntax that may denote traditional syntactical use. In some implementations, the plurality of input characters can be descriptive of a plurality of words and/or a plurality of separators (e.g., spaces, commas, periods, slashes, etc.).

In some implementations, the prompt may include any other suitable inputs, such as images, and/or the like.

Further, at 406, the computing system provides the prompt to a generative model, the generative model being a machine-learned model trained to process language input prompts to generate a language output. For instance, as described above, the computing system may provide the prompt to a generative model (e.g., machine-learned model(s) 120, 140) trained to process language input prompts (e.g., natural language prompts having natural language or a combination of natural language and other inputs (e.g., images, etc.)) to generate a language output (e.g., natural language, code, and/or the like). The model may be any suitable model (e.g., a transformer model, a stable diffusion model, an autoregressive language model, and/or the like) trained to process a prompt and generate one or more content outputs.

Furthermore, at 408, the computing system receives a generative output generated by the generative model in response to the prompt. For example, as described above, the generative output can include text (e.g., a natural language response, code, etc.), one or more images (e.g., a generated image of the described prompt), an audio file, a video, statistical data, latent encoding data, and/or other signal data responsive to the prompt. The generative output may be provided according to a structured template (e.g., prose template, article template, email template, meeting template, invoice template, table template, code template, etc.) generated and/or selected by the model according to the requested type of output in the prompt.

Moreover, at 410, the computing system generates a modified output by modifying the generative output based at least in part on historical user data for a user associated with the prompt. For instance, as indicated above, a modified output may be generated by the computing system (i.e., outside of the model) by modifying the generative output based at least in part on historical user data (e.g., user name, user contact information, contacts, location history, etc.) associated with the prompt. For example, fields in the generative output may be populated by the computing system, not by the model, with appropriate user data. In some instances, as described above, the modified output may additionally be generated by modifying the generative output based on formatting rules of the integrated development environment.

Additionally, at 412, the computing system provides the modified output via the user interface. For instance, as discussed above, the modified output may be provided via the user interface (e.g., via user interface(s) 142). For example, the modified output may be displayed or be otherwise accessible by a user via the interface component(s) 122 of the user computing device 102. The modified output may be provided in-line within a general workspace (e.g., general workspace 304) of the integrated development environment. As such, content may be generated using a generative model and automatically personalized, structured, and formatted for insertion within an integrated development environment.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computing system for automatically generating personalized and structured content, the computing system comprising:

one or more processors; and one or more non-transitory computer-readable media that collectively store instructions that, when executed by the one or more processors, cause the computing system to perform operations, the operations comprising:

providing a user interface to a user computing system, the user interface including an integrated development environment in which content is insertable in-line by at least a user of the user computing system;

receiving a prompt from the user of the user computing system via the user interface;

providing the prompt to a generative model, the generative model being a machine-learned model trained to process language input prompts to generate a language output;

receiving a generative output generated by the generative model in response to the prompt;

providing the generative output via the user interface in a generative area of the integrated development environment, the generative area separating the generative output from being in-line within the integrated development environment;

receiving an insertion request from the user of the user computing system via the user interface subsequent to providing the generative output, the insertion request being associated with accepting the generative output for insertion in-line within the integrated development environment;

generating, in response to receiving the insertion request, a modified output by modifying the generative output based at least in part on historical user data for the user; and providing the modified output via the user interface and in-line within the integrated development environment.

2. The computing system of claim 1, wherein receiving the prompt from the user computing system via the user interface comprises receiving the prompt from within the generative area of the user interface.

3. The computing system of claim 1, wherein the integrated development environment comprises at least one formatting selection interface for selecting formatting rules for text in-line within the integrated development environment, wherein providing the modified output via the user interface comprises inserting the modified output in-line within the integrated development environment and formatted according to the formatting rules.

4. The computing system of claim 1, wherein receiving the prompt from the user computing system via the user interface comprises receiving selection of text within the user interface, the text being formatted according to embedded formatting rules, wherein generating the modified output comprises generating the modified output by modifying the generative output based at least in part on the historical user data and the embedded formatting rules received with the selection of text.

5. The computing system of claim 1, wherein the generative output comprises a block template generated by the generative model, the block template defining one or more fields associated with the prompt, wherein generating the modified output comprises populating eligible fields of the one or more fields within the block template based on the historical user data, the eligible fields being associated with the historical user data.

6. The computing system of claim 1, wherein the historical user data is not provided to the generative model.

7. The computing system of claim 1, wherein the historical user data includes one or more of a name, contact information, contacts, calendar events, or location history associated with the user.

8. The computing system of claim 1, wherein the historical user data is defined by a user during set-up of a user profile for use with the integrated development environment.

9. A computer-implemented method for automatically generating personalized and structured content, the method comprising:

providing, by a computing system comprising one or more processors, a user interface to a user computing system, the user interface including an integrated development environment in which content is insertable in-line by at least a user of the user computing system;

receiving, by the computing system, a prompt from the user of the user computing system via the user interface;

providing, by the computing system, the prompt to a generative model, the generative model being a machine-learned model trained to process language input prompts to generate a language output;

receiving, by the computing system, a generative output generated by the generative model in response to the prompt;

generating, by the computing system, a modified output by modifying the generative output based at least in part on historical user data for the user, wherein the historical user data is not provided to the generative model; and providing, by the computing system, the modified output via the user interface and in-line within the integrated development environment.

10. The computer-implemented method of claim 9, wherein receiving, by the computing system, the generative output generated by the generative model comprises:

receiving, by the computing system, the generative output generated by the generative model; and providing, by the computing system, the generative output via the user interface.

11. The computer-implemented method of claim 10, further comprising receiving, by the computing system, an insertion request from the user of the user computing system via the user interface subsequent to providing the generative output, wherein generating, by the computing system, the modified output comprises generating, by the computing system, the modified output in response to receiving the insertion request.

12. The computer-implemented method of claim 9, wherein the generative output comprises a block template generated by the generative model, the block template defining one or more fields associated with the prompt, wherein generating, by the computing system, the modified output comprises populating, by the computing system, eligible fields of the one or more fields within the block template based on the historical user data, the eligible fields being associated with the historical user data.

13. The computer-implemented method of claim 9, wherein the historical user data includes one or more of a name, contact information, contacts, calendar events, or location history associated with the user.

14. One or more non-transitory computer-readable media that collectively store instructions that, when executed by one or more computing devices, cause the one or more computing devices to perform operations, the operations comprising:

providing a user interface to a user computing system, the user interface including an integrated development environment in which content is insertable in-line by at least a user of the user computing system;

receiving a prompt from the user of the user computing system via the user interface;

providing the prompt to a generative model, the generative model being a machine-learned model trained to process language input prompts to generate a language output;

receiving a generative output generated by the generative model in response to the prompt;

generating a modified output by modifying the generative output based at least in part on historical user data for the user, wherein the historical user data is not provided to the generative model; and providing the modified output via the user interface.

15. The one or more non-transitory computer-readable media of claim 14, wherein the generative output comprises a block template generated by the generative model, the block template defining one or more fields associated with the prompt, wherein generating the modified output comprises populating eligible fields of the one or more fields within the block template based on the historical user data, the eligible fields being associated with the historical user data.

16. The one or more non-transitory computer-readable media of claim 14, wherein the historical user data includes one or more of a name, contact information, contacts, calendar events, or location history associated with the user.

* * * * *